(12) United States Patent
Zhou et al.

(10) Patent No.: US 11,561,209 B2
(45) Date of Patent: Jan. 24, 2023

(54) METHOD FOR SIMULTANEOUS DETERMINATION OF NITROGEN AND OXYGEN ISOTOPE COMPOSITIONS OF NATURAL NITRATE AND NITRITE

(71) Applicant: SHAANXI UNIVERSITY OF SCIENCE & TECHNOLOGY, Shaanxi (CN)

(72) Inventors: Youping Zhou, Shaanxi (CN); Bo Wang, Shaanxi (CN); Zhenyu Zhu, Shaanxi (CN); Ran Ma, Shaanxi (CN); Yan Huang, Shaanxi (CN); Shuai Zheng, Shaanxi (CN); Ying Wang, Shaanxi (CN); Benli Zhang, Shaanxi (CN)

(73) Assignee: SHAANXI UNIVERSITY OF SCIENCE & TECHNOLOGY, Shaanxi (CN)

( * ) Notice: Subject to any disclaimer, the term of this patent is extended or adjusted under 35 U.S.C. 154(b) by 386 days.

(21) Appl. No.: 16/768,893

(22) PCT Filed: Feb. 7, 2020

(86) PCT No.: PCT/CN2020/074526
§ 371 (c)(1),
(2) Date: Jun. 2, 2020

(87) PCT Pub. No.: WO2021/109336
PCT Pub. Date: Jun. 10, 2021

(65) Prior Publication Data
US 2022/0291179 A1 Sep. 15, 2022

(30) Foreign Application Priority Data

Dec. 6, 2019 (CN) .......................... 201911242698.7

(51) Int. Cl.
*G01N 30/72* (2006.01)
*G01N 30/46* (2006.01)
(Continued)

(52) U.S. Cl.
CPC ....... *G01N 30/7206* (2013.01); *G01N 30/465* (2013.01); *G01N 30/8679* (2013.01);
(Continued)

(58) Field of Classification Search
CPC ............. B01D 15/12; G01N 2030/025; G01N 2030/067; G01N 2030/125;
(Continued)

(56) References Cited

FOREIGN PATENT DOCUMENTS

| CN | 102887492 A | 1/2013 |
|----|-------------|--------|
| CN | 105486793 A | 4/2016 |

(Continued)

OTHER PUBLICATIONS

Tsikas Dimitrios et al: Simulbaneous Measuremen'b of [ 15 NINitrate and [15N]Nitrite Enrichment and Concentration in Urine by Gas Chromatography Mass Spectrometry as Pentafluorobenzyl Derivatives, Analytical Chemistry, [Online] vol. 82, No. 6, Mar. 15, 2010 (Mar. 15, 2010), pp. 2585-2587, XP055907667, US ISSN: 0003-2700, DOI: 10.1021/ac902970m Retrieved from the Internet: URL:https://pubs.acs.org/doi/pdf/IO.1021/a.c902970m>.
(Continued)

*Primary Examiner* — David L Singer
(74) *Attorney, Agent, or Firm* — Gang Yu

(57) ABSTRACT

A method for simultaneous determination of nitrogen and oxygen isotope compositions of natural nitrate and nitrite, which quantitatively converts natural nitrate and nitrite into an organic ester and a nitro-compounds respectively, and then nitrate and nitrite $\delta^{18}O$ and $\delta^{15}N$ are simultaneously determined by adopting a gas chromatography/pyrolysis/gas chromatography/isotope ratio mass spectrometry coupling
(Continued)

technology (GC/Py/GC/IRMS). According to the method for simultaneously determining the nitrogen and oxygen isotope compositions of the natural nitrate salt and nitrite salt, the small amount of sample does not result in the loss, acquisition, exchange and fractionation of nitrogen and oxygen.

13 Claims, 19 Drawing Sheets

(51) Int. Cl.
    *G01N 30/86*     (2006.01)
    *G01N 30/02*     (2006.01)
    *G01N 30/12*     (2006.01)
    *G01N 30/88*     (2006.01)

(52) U.S. Cl.
    CPC . *G01N 2030/025* (2013.01); *G01N 2030/125* (2013.01); *G01N 2030/8868* (2013.01)

(58) Field of Classification Search
    CPC ... G01N 2030/8405; G01N 2030/8868; G01N 30/02; G01N 30/06; G01N 30/12; G01N 30/465; G01N 30/7206; G01N 30/8679; Y02W 10/10
    See application file for complete search history.

(56) References Cited

FOREIGN PATENT DOCUMENTS

| | | | |
|---|---|---|---|
| CN | 108267527 A | 7/2018 | |
| CN | 109856308 A | 6/2019 | |
| EP | 1939142 A1 * | 7/2008 | ............ B01J 41/043 |
| JP | 2008096400 A * | 4/2008 | |

OTHER PUBLICATIONS

Houben Els et al:"Quantification of 15 N-Nitrate in Urine with Gas Chromatography Combustion Isotope Ratio Mass Spectrometry to Estimate Endogenous NO Production", Analytical Chemistry, [Online] vol. 82, No. 2, Jan. 15, 2010 (Jan. 15, 2010), pp. 601-607, XP055907675, US ISSN: 0003-2700, DOI: 10.1021/ac9019208 Retrieved from the Internet: URL:https://pubs.acs.org/doi/pdf/IO.1021/a c9019208> [retrieved on Mar. 31, 2022].

Silva S R et al: A new method, for collection of nitrate from fresh water and the analysis of nitrogen and oxygen sotope ratios, Journal of Hydrology, Elsevier, Amsterdam, NL, vol. 228, No. 1-2, Feb. 21, 2000 (Feb. 21, 2000), pp. 22-36, XP002432717, ISSN: 0022-1694, DOI:10.1016/S0022-1694(99)00205-X.

Search Report for corresponding EP application No. 20732717.2 dated Apr. 12, 2022.

Yang, Zhi et al. "Progress in Nitrogen and Oxygen Isotopic Composition of Nitrate in Seawater" Advances in Earth Science. Mar. 31, 2012 (Mar. 31, 2012). vol. 27, No. 3. pp. 268-275.

Zhao, Jingjing et al. "Stable Nitrogen Isotope Analysis of Amino Acids by Gas Chromatography-Combustion-Isotope Ratio Mass Spectrometry for High-Resolution Trophic Level Estimation". Chinese Journal of Analytical Chemistry, Mar. 31, 2017 (Mar. 31, 2017). vol. 45, No. 3. pp. 309-315.

Ahmed, M.A. et al. "A modified procedure for measuring oxygen-18 content of nitrate". Journal of Hydrology. Sep. 23, 2012 (Sep. 23, 2012). vol. 472-473. pp. 193-204.

International Search Report for corresponding application filed Feb. 7, 2020; dated Sep. 10, 2020.

\* cited by examiner (Note: compound a is generated by the reaction of excess raw material b and trace water in the solvent)

METHOD FOR SIMULTANEOUS DETERMINATION OF NITROGEN AND OXYGEN ISOTOPE COMPOSITIONS OF NATURAL NITRATE AND NITRITE

FIELD

The disclosure belongs to the technical field of isotope determination, and particularly relates to a method for simultaneous determination of nitrogen and oxygen isotope compositions of natural nitrate and nitrite.

BACKGROUND

Techniques for determining oxygen and nitrogen isotopic compositions in nitrate and nitrite are frequently used to trace and identify nitrogen sources and their biological, geochemical and chemical conversion (e.g., nitrification, denitrification) in environmental and biological systems. The isotopic composition of an element is generally denoted as $\delta = (R_{sample}/R_{standard} - 1) \times 1000$, where R is the abundance ratio of the heavy isotope to the light isotope of an element (e.g., $^{18}O/^{16}O$, $_{15}N/^{14}N$), and the subscripts "sample" and "standard" represent the sample and the international standard of this element, respectively. Oxygen and nitrogen isotopic ratios are expressed as $\delta^{18}O$ and $\delta^{15}N$, respectively.

At present, the main methods for the (pretreatment of samples for) determination of oxygen and nitrogen isotopic ratios ($\delta^{18}O$ and $\delta^{15}N$) in nitrate can be divided into three categories: 1) anion ion exchange to silver nitrate; 2) bacterial denitrification to $N_2O$; 3) reduction with cadmium and azide to $N_2O$;

The anion exchange to silver nitrate method has the following shortcomings: 1) in order to obtain high purity $AgNO_3$ and $AgNO_2$ for reliable isotope analysis, a tedious sample pretreatment must be carried out to eliminate the interference of other nitrogen- and oxygen-containing contaminants; 2) nitrate and nitrite cannot be separated, and therefore only $\delta^{18}O$ and $\delta^{15}N$ values for silver nitrate and silver nitrite mix are obtained; 3) large amounts (usually more than 0.2 mg) of pure $AgNO_3$ and $AgNO_2$ are needed for the analysis, therefore large amounts of samples need to be collected and processed to obtain enough $AgNO_3$ and $AgNO_2$ for replicate analysis; 4) not suitable for high salinity samples such as sea water; 5) $\delta^{18}O$ and $\delta^{15}N$ cannot be simultaneously measured with one analysis.

The bacterial denitrification to $N_2O$ method has the following shortcomings: 1) dedicated bacterial culture facilities and skills are required; 2) the method is not applicable to samples containing heavy metals or pesticides and other contaminants that may poison the denitrifying bacteria; 3) in the process of converting nitrate and nitrite to $N_2O$, ⅚ and ⅔ of the oxygen in the nitrate and nitrite respectively are lost; a portion of the O in the target gas $N_2O$ is subjected to isotope exchange with O in the reaction system; the conversion rate of nitrate and nitrite to $N_2O$ is not high; there is fractionation of the nitrogen and oxygen isotopes so that accurate and reliable $\delta^{18}O$ and $\delta^{15}N$ cannot be obtained; 4) if determination of $\delta^{18}O$ and $\delta^{15}N$ in nitrate and nitrite is desired, two independent bacterial denitrifications are needed; 5) impossible to simultaneously measure $\delta^{18}O$ and $\delta^{15}N$ in the same analysis.

The method of reduction with cadmium and azide to $N_2O$ has the following shortcomings: 1) the sodium azide used in the method is both toxic and explosive; 2) nitrate and nitrite are simultaneously reduced to $N_2O$, and the obtained $\delta^{18}O$ and $\delta^{15}N$ comprise a mixed contribution of nitrate and nitrite; 3) as in the bacterial denitrification process, ⅔ oxygen is lost in the process of nitrate reduction to $N_2O$. Some of the O in the $N_2O$ target gas is subjected to isotope exchange with O in the reaction system, wherein ½ of N is derived from the azide reagent. Furthermore the conversion rate of nitrate to $N_2O$ was not high, which often results in nitrogen and oxygen isotope fractionation such that accurate and reliable $\delta^{18}O$ and $\delta^{15}N$ cannot be obtained; 4) the catalytic "cadmium sponge" needs to be prepared in advance; 5) $\delta^{18}O$ measurement has stringent pH dependence; 6) if an IRMS is used for isotope composition determination, it is not possible to simultaneously determine both $\delta^{18}O$ and $\delta^{15}N$ with one injection; 7) not suitable for high salinity samples (e.g., sea water, etc.).

SUMMARY

The purpose of the present disclosure is to provide a method for simultaneous determination of nitrogen and oxygen isotope compositions of natural nitrate and nitrite, with small amount of sample and that does not result in the loss, gain, exchange or fractionation of nitrogen and oxygen isotopes.

The technical scheme adopted by the present disclosure is a method for simultaneous determination of nitrogen and oxygen isotope compositions of natural nitrate and nitrite. The nitrate and nitrite are quantitatively converted into organic ester and nitro-compounds respectively, following which the $\delta^{18}O$ and $\delta^{15}N$ of the respective nitrate and nitrite are simultaneously determined by gas chromatography/pyrolysis/gas chromatography/isotope ratio mass spectrometry (GC/Py/GC/IRMS).

The disclosure is also characterized by being specifically implemented according to the following steps:

step 1, refitting the GC/Py/IRMS instrument

Inserting a chromatographic column GC2 for separating CO and $N_2$ generated by pyrolysis between the pyrolysis furnace and the IRMS to convert a GC/Py/IRMS to a GC/Py/GC/IRMS instrument;

step 2, preparing a sample

Simultaneously converting the nitrate and nitrite in a natural sample to benzyl nitrate ($PhCH_2ONO_2$) and phenyl nitromethane ($PhCH_2NO_2$), respectively.

step 3, simultaneously determining $\delta^{18}O$ and $\delta^{15}N$ in benzyl nitrate ($PhCH_2ONO_2$) and phenyl nitromethane ($PhCH_2NO_2$) by using the refitted instrument in the step 1, thus obtaining the $\delta^{18}O$ and $\delta^{15}N$ of the natural nitrate and nitrite indirectly.

The specific process of step 2 is as follows:

step 2.1, obtaining $HNO_3$ and $HNO_2$ by anion exchange

Enriching nitrate and nitrite in a natural sample by selectively absorbing them onto an anion exchange column, and then recovering the nitrate and nitrite by elution with HCl to obtain $HNO_3$ and $HNO_2$ solutions, namely solution A;

step 2.2, converting $HNO_3$ and $HNO_2$ to $AgNO_3$ and $AgNO_2$, respectively

Adding $Ag_2O$ into the solution A, stirring until the pH value of the solution is 6-7 to obtain a $AgNO_3$ and $AgNO_2$ solution (solution B); freeze-drying the solution B to obtain a $AgNO_3$ and $AgNO_2$ solid; dissolving the $AgNO_3$ and the $AgNO_2$ in acetonitrile ($CH_3CN$), centrifuging to remove interferents insoluble in the acetonitrile ($CH_3CN$) to obtain a purified $AgNO_3$ and $AgNO_2$ acetonitrile solution, namely solution C;

step 2.3, converting $AgNO_3$ and $AgNO_2$ into an organic ester and a nitro-compound, respectively Adding benzyl bromide into the solution C; stirring for 1-5 h at room temperature to obtain an acetonitrile reaction solution (solution D) of benzyl nitrate ($PhCH_2ONO_2$), phenyl nitromethane ($PhCH_2NO_2$) and residual benzyl bromide;

Step 2.4, postprocessing

Centrifuging to remove AgCl precipitates in the solution D; Performing GC/MS analysis on the solution D to determine the concentrations of the components; diluting or concentrating the solution to bring the concentration to that required by the GC/Py/GC/IRMS analysis; storing in brown container at 5° C.

In step 2.3, the molar ratio of benzyl bromide to $AgNO_3$+$AgNO_2$ is greater than 1:1.

In step 2.4, the GC/Py/GC/IRMS analysis requires a concentration of 0.5 mg/ml to 1.0 mg/ml.

The specific process of step 3 is as follows:

setting GC/Py/GC/IRMS instrumentation parameters and analytical conditions, and running a sample in a CO mode when the instrument is stablized; after being separated by a chromatographic column GC1, benzyl nitrate and phenyl nitromethane sequentially enter a pyrolysis furnace HTC (high temperature conversion), wherein oxygen and nitrogen are converted into CO and $N_2$, respectively; separating the CO and $N_2$ gas mixture in a chromatographic column GC2, and sequentially performing IRMS analysis to obtain $\delta^{18}O$ and $\delta^{15}N$ isotope compositions of benzyl nitrate and phenyl nitromethane respectively.

The chromatographic column GC1 is a medium-polarity or weak-polarity gas chromatographic column.

The chromatographic column GC1 is HP-5, 5%-phenyl-methylpolysiloxane, 30 m in length and 0.25 mm in inner diameter.

The chromatographic column GC2 is of a molecular sieve type.

The chromatographic column GC2 is HP-MolSieve, 10 m in length, 0.32 mm in inner diameter.

The beneficial effects of the present disclosure are:

1) simultaneous measurement of nitrate and nitrite O and N isotope ratios;

2) wide application range, the method is suitable for all types of samples, including fresh water, sea water, animals and plants, soil and air;

3) greatly reduced sample consumption; open ocean seawater can now be routinely analysed, despite low concentrations and high salinity; snow water in north and south poles, high-altitude precipitation, clean air particle samples and the like can also be analysed;

4) suitable for analysis of samples collected in the field;

5) easy to realize the automation of sample processing, saving time, manpower, material and cost; simplifying the determining process and shortening the time of analysis;

6) method allows high throughput of samples using an autosampler interfaced with the GC/IRMS without interruption, providing a novel, innovative and sensitive analytical tool for the analysis of $\delta^{18}O$ and $\delta^{15}N$ of nitrate and nitrite.

BRIEF DESCRIPTION OF THE DRAWINGS

The drawings, which constitute a part of this application, are used to provide a further understanding of the present disclosure. The illustrative embodiments of the present disclosure and the descriptions thereof are used to explain the present disclosure, but do not constitute an improper limitation on the present disclosure. In the drawings.

DETAILED DESCRIPTION

It should be noted that the embodiments and features described in the embodiments herein may be combined with one another without conflict. The present disclosure will be described in detail below with reference to the drawings and in conjunction with the embodiments.

As stated in the background of the present application, prior art methods for the determination of nitrate oxygen and nitrogen isotope ratios ($\delta^{18}O$ and $\delta^{15}N$) have lacked accuracy due to the fractionation of nitrogen and oxygen isotopes, or the inability to measure the oxygen and nitrogen isotope compositions simultaneously for nitrate and nitrite as they cannot effectively separate nitrate and nitrite. In order to solve these problems, the disclosure provides a system and a method for simultaneous determination of nitrogen and oxygen isotope compositions in nitrate and nitrite.

Figure 19:
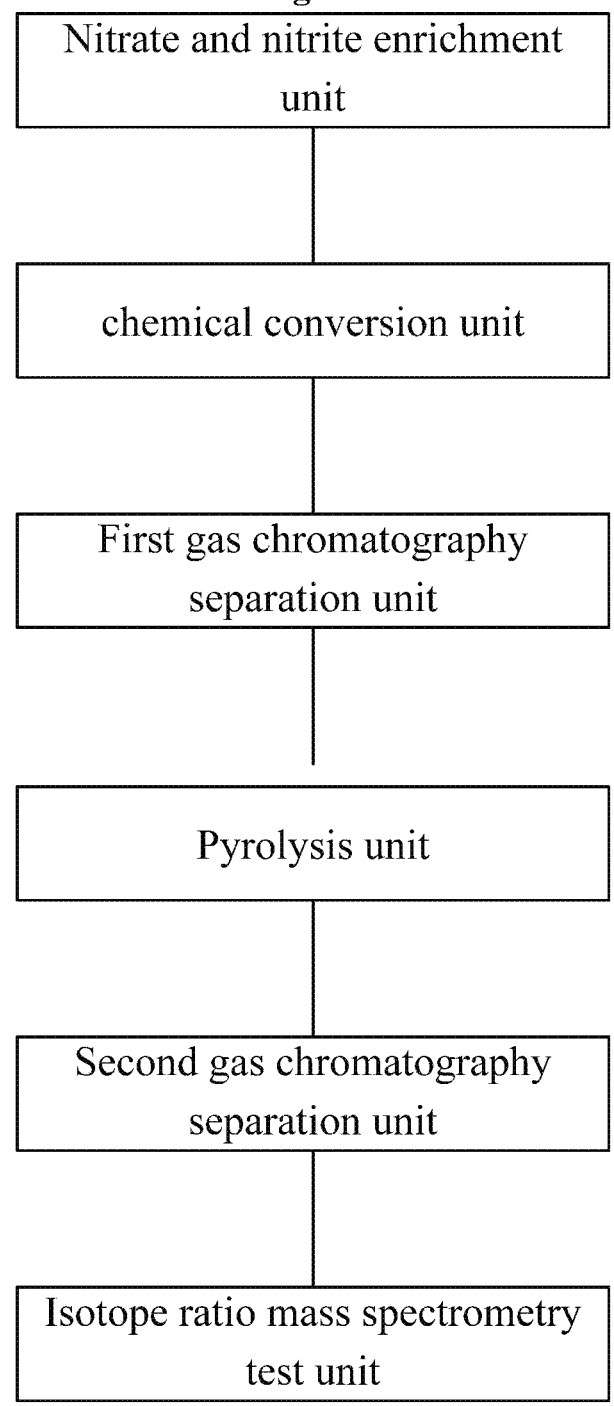
FIG. 19 shows a schematic diagram of the system for simultaneous determination of nitrogen and oxygen isotopic compositions in nitrate and nitrite of the present application.

In a typical embodiment of the present application, a system for simultaneous determination of nitrogen and oxygen isotope compositions in nitrate and nitrite is provided, as shown in FIG. 19. The system comprises a nitrate and nitrite enrichment unit, a chemical conversion unit, a first gas chromatographic separation unit, a pyrolysis unit, a second gas chromatographic separation unit and an isotope ratio mass spectrometry unit. The nitrate and nitrite enrichment unit is used for enriching nitrate and nitrite in a sample to be analyzed in the form of a $HNO_3$ and $HNO_2$ to form an enrichment aqueous solution; the chemical conversion unit interfaced with the nitrate and nitrite enrichment unit is used for converting the $HNO_3$ and $HNO_2$ into $RONO_2$ and into $RNO_2$, respectively, wherein R is a $C_1$-$C_{20}$ alkyl group with or without an aryl substituent of 6-12 carbons; the first gas chromatographic separation unit interfaced with the chemical conversion unit is used for separating the $RONO_2$ and the $RNO_2$; the pyrolysis unit interfaced with the first gas chromatographic separation unit is used for pyrolyzing the $RONO_2$ and the $RNO_2$ to CO and $N_2$; the second gas chromatographic separation unit interfaced with the pyrolysis unit is used for separating the CO and the $N_2$; and the isotope ratio mass spectrometry unit interfaced with the second gas chromatography separation unit is used for performing $\delta^{18}O$ and $\delta^{15}N$ isotope analysis on the CO and the $N_2$, respectively.

Taking advantage of the chemical differences of inorganic nitrate and nitrite, converting them with an organic bromide (benzyl bromide) to volatizable organic nitrate ($RONO_2$) and nitro-compound ($RNO_2$) endows them with the possibility of being able to be separated by gas chromatography; the separation of the $RONO_2$ and the $RNO_2$ is realized by the first gas chromatography separation unit; followed by pyrolyzing the separated $RONO_2$ and $RNO_2$, respectively to a CO and $N_2$ mixture; separating the CO and $N_2$ gas mixture by using the second gas chromatography separation unit; and $\delta^{18}O$ and $\delta^{15}N$ isotope analysis is carried out on CO and $N_2$ by using the isotope ratio mass spectrometry test unit after separation, so that the oxygen and nitrogen isotope ratio of the corresponding the nitrate and the nitrite can be obtained. Experiments have proved that the above system does not cause isotope fractionation; the pyrolysis efficiency, the accuracy and the precision are high; the content of pyrolysis byproducts is very low; the benzyl nitrate and phenyl nitromethane are chemically and isotopically stable, and the $\delta^{18}O$ and $\delta^{15}N$ isotope analysis is reliable.

With the above system, the O and N isotope analysis of nitrate and nitrite can be simultaneously carried out; there is a wide range of applications with the system being suitable for all types of samples such as fresh water, sea water, animals and plants, soil and air. The greatly enhanced analytical sensitivity and greatly reduced sample consumption means that samples with low concentrations of nitrate and nitrite or highly saline samples can now be analysed. These include open ocean seawater, snow water from north and south poles (high latitudes), high-altitude precipitation, clean air particle samples, samples collected in the field. It is easy to automate sample processing, saving time, manpower, material and cost; simplifying the analytical process and saving time. Combining automatic sampling and GC/IRMS analysis allows for continuous analysis of a large number of samples without interruption, providing an unparalleled and innovative analytical tool for the analysis of $\delta^{18}O$ and $\delta^{15}N$ of nitrate and nitrite.

The first gas chromatographic separation unit of the application is mainly used for separating $RONO_2$ and $RNO_2$, so any chromatographic column that can achieve their separation can be used in this application. Experiments have proved that when the first chromatographic column of the first gas chromatography separation unit is a medium-polarity or weak-polarity gas chromatographic column, the separation effect of the two is better; preferably, the first chromatographic column is an HP-5 chromatographic column with 5%-phenyl-methyl polysiloxane bonded phase or a DB-HeavyWAX chromatographic column with a polyethylene glycol bonded phase. Further, preferably the above-mentioned HP-5 chromatographic column is 30 m in length and 0.25 mm in inner diameter.

The second gas chromatographic separation unit is used for separating CO and $N_2$ in each pyrolytically generated gas mixture, and since the main pyrolytic products are CO and $N_2$, a chromatographic column capable of realizing the separation of the two can be considered for the present application. The chromatographic column of the second gas chromatographic separation unit is a second chromatographic column, the second chromatographic column is a molecular sieve type chromatographic column, preferably the second chromatographic column is an HP-Molseive chromatographic column or an HP-PLOT Q chromatographic column, further preferably an HP-Molseive chromatographic column with a length of 10 m and an inner diameter of 0.32 mm.

Figure 1:
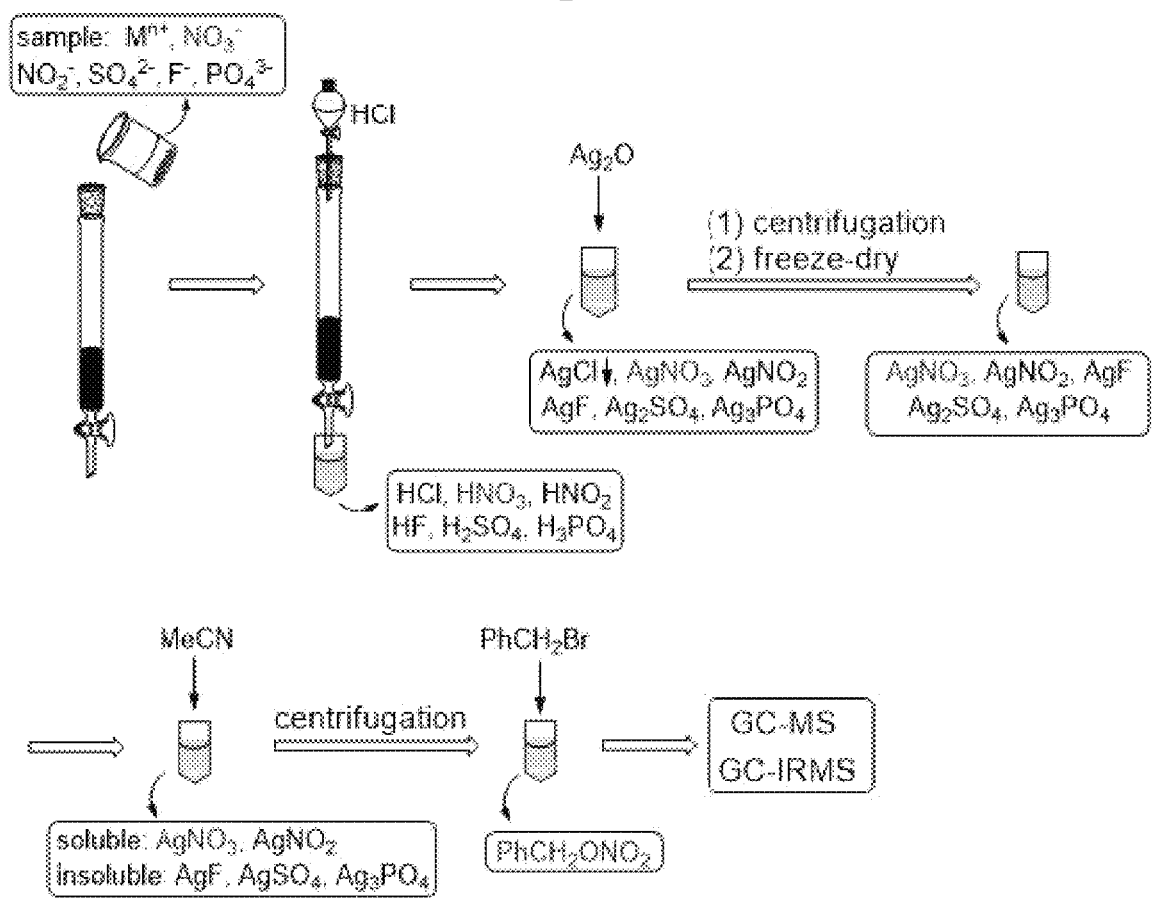
FIG. 1 is a process schematic diagram of step 2 of the method for simultaneous determination of nitrogen and oxygen isotopic compositions of natural nitrate and nitrite according to the present disclosure.
Figure 2:
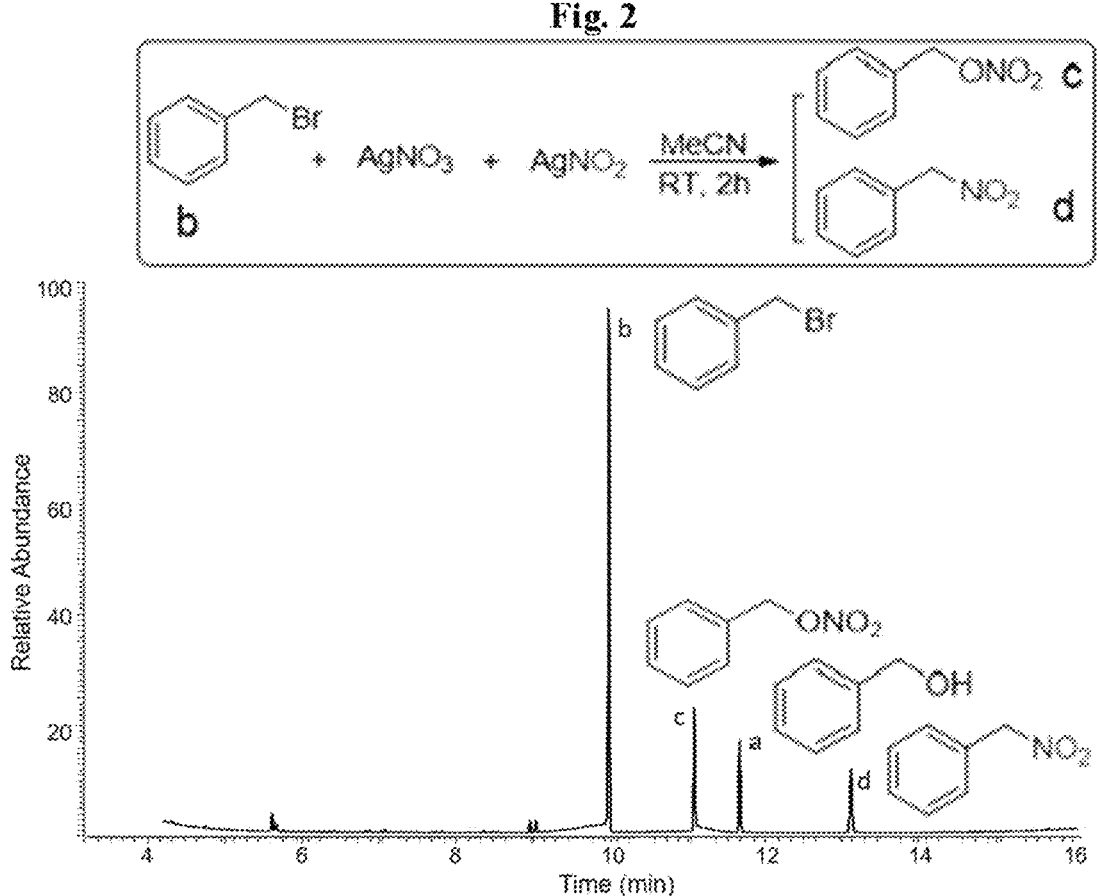
FIG. 2 is a GC/MS spectrum of a product after chemical conversion of silver nitrate and silver nitrite in the method for simultaneous determination of nitrogen and oxygen isotope compositions of natural nitrate and nitrite according to the present disclosure.

In one embodiment of the application, as shown in FIG. 1, the nitrate and nitrite enrichment unit comprises an anion exchange column and a hydrochloric acid supply device, wherein the anion exchange column is used for enriching anions in a sample to be analyzed; a hydrochloric acid supply device, connected with the ion exchange column and used for eluting the anion exchange column to obtain the enrichment solution containing $HNO_3$ and $HNO_2$, and the preferred anion exchange resin of the anion exchange column is AG1-X8 anion exchange resin or 717 strong alkaline anion exchange resin in chloride form, such as AG1-X8 (200-400 mesh, resin in chloride form) of the Bio-Rad Corporation. Using an anion exchange column to exchange the nitrate ions and nitrite ions in the sample to be analyzed. If the sample to be analysed also contains other anions, it can also be exchanged; the anion exchange column is then eluted with hydrochloric acid, and the anions in the anion exchange column are recovered to form the enrichment solution containing $HNO_3$ and $HNO_2$, although other soluble anions are dissolved together in the enrichment solution. Or the nitrate and nitrite enrichment unit comprising a cation exchange column, used for enriching anions in the sample to be analyzed to obtain the enrichment solution containing $HNO_3$ and $HNO_2$, and preferably the cation exchanger is 732 strongly acidic cation exchange resin in hydrogen form. A cation exchange column is adopted to enrich anions in a sample to be analyzed with high salinity and low concentration (such as seawater with low nitrate and nitrite concentration and high salinity), that is the sample to be analysed passes through the cation exchange column, the cations in the sample to be analysed are intercepted, and the anions flow out to be enriched.

In another embodiment of the present application, the chemical conversion unit comprises: a silver oxide supply device, a first reaction device, a first solid-liquid separation device, a drying device, a dissolving device, an optional second solid-liquid separation device, an R-X supply device, a second reaction device and a third solid-liquid separation device; the silver oxide supply device is used for supplying silver oxide to the first reaction device, the silver oxide reacts with the enrichment solution in the first reaction device to form a product system containing a silver salt; the first solid-liquid separation device, used for performing solid-liquid separation on the product system to obtain a solution containing $AgNO_3$ and $AgNO_2$, and preferably the first solid-liquid separation device is a centrifuge device; the solution containing $AgNO_3$ and $AgNO_2$ is dried in the drying device to obtain a dry solid containing $AgNO_3$ and $AgNO_2$, and preferably the drying device is a freeze-drying device; dissolving the $AgNO_3$ and $AgNO_2$ of the dry solid in the dissolving device by using an organic solvent to obtain a suspension liquid; the second solid-liquid separation device, used for performing solid-liquid separation on the suspension liquid to obtain an organic solution containing $AgNO_3$ and $AgNO_2$, and preferably the second solid-liquid separation device is a centrifuge device; X in R-X is halogen (such as Cl, Br, I); the R-X supply device supplies R-X to the second reaction device, and the second reaction device is used for reacting an organic solution separated by the second solid-liquid separation device with the R-X to convert $AgNO_3$ and $AgNO_2$ in the organic solvents to $RONO_2$ and $RNO_2$, respectively; a third solid-liquid separation device is used for performing solid-liquid separation on a reaction product in the second reaction device, and preferably the third solid-liquid separation device is a centrifuge device.

Selecting silver oxide in the first reaction device to precipitate redundant Cl ions in the enrichment solution, and removing the precipitate by using the first solid-liquid separation device; removing water by using the drying device, wherein isotope fractionation in the drying process can be effectively avoided by freeze-drying the sample, and then further dissolving freeze-dried solids in organic solvents, so that silver nitrate and silver nitrite are dissolved, and other substances are not dissolved; then using the second solid-liquid separation device for solid-liquid separation. If the sample to be analysed contains no anions other than nitrate ions and nitrite ions, the second solid-liquid separation device is not required for separation; and in the organic solution, converting the silver nitrate and silver nitrite to $RONO_2$ and $RNO_2$, respectively in the second reaction device by reacting with R-X, and removing the silver halide (AgX) precipitate generated in the above reaction by using the second solid-liquid separation device to obtain the pure solution to be detected containing the $RONO_2$ and the $RNO_2$. The steps are easily carried out and involves no loss of materials and isotopic fractionation.

In yet another exemplary embodiment of the present application, a method for simultaneously determining the nitrogen and oxygen isotopic compositions of nitrate and nitrite is provided, the method comprising: step S1, converting nitrate in a sample to be detected to $RONO_2$, converting nitrite in a sample to be analyzed to $RNO_2$ to form a solution to be detected, wherein R is a $C_1$-$C_{20}$ alkyl group with or without an aryl substiuent of 6-12 carbons; step S2, determining $RONO_2$ and $RNO_2$ in the solution to be analyzed by adopting a gas chromatography/pyrolysis/gas chromatography/isotope ratio mass spectrometry coupling technology (GC/Py/GC/IRMS) to perform $\delta^{18}O$ and $\delta^{15}N$ isotope analysis.

Taking advantage of the chemical differences of inorganic nitrate and nitrite, converting them with an organic bromide (benzyl bromide) to volatizable organic nitrate ($RONO_2$) and nitro-compound ($RNO_2$) endows them with the possibility of being able to be separated with gas chromatography; the separation of the $RONO_2$ and the $RNO_2$ is realized by the first gas chromatography separation unit; followed by pyrolyzing the separated $RONO_2$ and $RNO_2$, respectively to a CO and $N_2$ mixture; separating the CO and $N_2$ gas mixture by using the second gas chromatography separation unit; and $\delta^{18}O$ and $\delta^{15}N$ isotope analysis is carried out on CO and $N_2$ by using the isotope ratio mass spectrometry unit after separation, so that the oxygen and nitrogen isotope ratio of the corresponding the nitrate and the nitrite can be obtained. Experiments have proved that the above system does not cause isotope fractionation; the pyrolysis efficiency, the accuracy and the precision are higher; the content of pyrolysis byproducts is very low; the formed organic compounds are (chemically and isotopically) stable, and the $\delta^{18}O$ and $\delta^{15}N$ isotope analysis is reliable.

With the above method, the nitrate and nitrite O and N isotope analysis can be simultaneously carried out with a wide range of applications, the method is suitable for all types of samples including fresh water, sea water, animal and plant material, soil and air; there is greatly reduced sample consumption, open ocean seawater which previously could not be successfully analyzed due to low nitrate and nitrite concentration and high salinity, snow water in north pole and south pole, high-altitude precipitation, clean air particle samples and the like can be analyzed with the above method; suitable for analysis of samples collected in the field; easy to realize the automation of sample processing, saving time, manpower, material and cost; simplifying the analytical process and reducing time of analysis with combined GC/IRMS automatic sampling, it can continuously analyze a large number of samples without interruption, providing an unparalleled and innovative analytical tool for the analysis of $^{18}O$ and $^{15}N$ of nitric acid salt and nitrous acid salt.

In one embodiment of the application, the above step S1 comprises: step S11, enriching anions in the sample to be analyzed by ion exchange to obtain an enrichment solution containing $HNO_3$ and $HNO_2$; step S12, reacting anions in the enrichment solution with $Ag_2O$ to obtain a product system containing $AgNO_3$ and $AgNO_2$; step S13, performing a first solid-liquid separation on the product system to obtain a solution containing silver nitrate and silver nitrite, and preferably the first solid-liquid separation is centrifugal separation; step S14, drying the solution containing silver nitrate and silver nitrite to obtain a dry solid containing silver nitrate and silver nitrite, preferably the drying is freeze-drying; step S15, dissolving silver nitrate and silver nitrite in the dry solid by using an organic solvent to obtain a suspension liquid, wherein the organic solvent is acetonitrile; step S16, performing a second solid-liquid separation on the suspension liquid to remove insoluble substances to obtain an organic solution of silver nitrate and silver nitrite, and preferably the second solid-liquid separation is centrifugal separation; step S17, reacting the organic solution with R-X to convert the silver nitrate in the organic solution into $RONO_2$, and converting the silver nitrite into $RNO_2$ to obtain a conversion system, wherein X is halogen (such as Cl, Br, I); and step S18, performing a third solid-liquid separation on the conversion system to obtain a solution to be analyzed, and preferably the third solid-liquid separation is centrifugal separation.

In the above step, the enrichment in step S11 can separate the nitrate and nitrite as completely as possible; the conversion of substances in the steps S12 to S17 is nearly quantitative, isotope fractionation is not caused, and therefore accuracy and reliability of test results are further guaranteed.

According to the step S11, different enrichment methods can be adopted for different samples to be analysed, for example, when the concentration of anions such as nitrate and nitrite ion in the samples to be analysed is low, the step S11 comprises: performing ion exchange on anions in the sample to be analyzed by adopting an anion exchange column to obtain an anion exchange column enriched with anions, preferably a filling resin of the anion exchange column is AG1-X8 anion exchange resin or 717 strong alkaline anion exchange resin in chloride form; replacing the anion containing the nitrate ion and the nitrite ion in the anion exchange column by hydrochloric acid to obtain the enrichment solution containing $HNO_3$ and $HNO_2$. When the anion concentration is high, the step S11 comprises: performing ion exchange on the cation in the sample to be analyzed by using a cation exchange column to obtain an enrichment solution containing $HNO_3$ and $HNO_2$, wherein the filling resin of the cation exchange column is 732 strong acidic cation exchange resin in the hydrogen form. In the process, a cation exchange column is adopted to concentrate anions in a sample to be detected with high concentration, that is the sample to be analyzed passes through the cation exchange column, the cations in the sample to be analysed are intercepted, and the anions flow out to be enriched.

For sufficiently rapid conversion of the nitrate ion and the nitrite ion, it is preferred that in the above step S17, the molar ratio of R-X to silver nitrate and silver nitrite (as a whole) is greater than 1:1 and preferably in the range of 1.2:1 to 1.5:1.

In order to improve the analytical accuracy, it is preferred that in the above step S2, the concentration of the solution to be analyzed is in the range of 0.5 mg/ml to 1.0 mg/ml. When the concentration of the solution to be analyzed obtained by the second solid-liquid separation is not in the range, adjust the concentration by adding a corresponding organic solvent or concentrating.

In another embodiment of the application, the above step S2 comprises: separating the $RONO_2$ and the $RNO_2$ in the solution to be analyzed by using a first gas chromatographic column to obtain separated $RONO_2$ and $RNO_2$; sequentially pyrolyzing the separated $RONO_2$ and $RNO_2$ to obtain pyrolysis gases containing CO and $N_2$; separating the CO and the $N_2$ in the pyrolysis gases with a second gas chromatographic column; and performing isotope ratio mass spectrometrical analysis on the CO and the $N_2$ sequentially to obtain $\delta^{18}O$ and $\delta^{15}N$ isotope compositions of CO and the $N_2$.

In the above process, the pyrolysis temperature can be between 1250° C. and 1300° C., but preferably at 1280° C., the consumption of $RONO_2$ and $RNO_2$ is small, the pyrolytic efficiency, the accuracy and the precision of isotope measurement are high, and the content of the pyrolysis byproduct $CO_2$ is low (<1%), indicating that the vast majority of the O in the $RONO_2$ and $RNO_2$ is converted to CO that can be detected by the instrument, so the oxygen isotope fractionation can be ignored, and the test results are more reliable.

Preferably, the first gas chromatographic column is a medium-polarity gas chromatographic column or a weak-polarity gas chromatographic column, preferably the first column is an HP-5 chromatographic column containing 5%-phenyl-methylpolysiloxane phase or a DB-HeavyWAX chromatographic column containing polyethylene glycol phase.

Preferably, the second gas chromatographic column is a molecular sieve type gas chromatographic column, preferably the second gas chromatographic column is an HP-Molseive chromatographic column or an HP-PLOT Q chromatographic column.

The beneficial effects of the present application are further illustrated by the following examples.

As shown in FIG. 1, according to the method for simultaneous determination of nitrogen and oxygen isotope compositions of natural nitrate and nitrite of the present disclosure, the nitrate and the nitrite are quantitatively converted to organic ester and nitro-compound, from which the $\delta^{18}O$ and $\delta^{15}N$ are simultaneously determined by adopting a gas chromatography/pyrolysis/gas chromatography/isotope ratio mass spectrometry coupling technology (GC/Py/GC/IRMS).

Being specifically implemented according to the following steps:

step 1, refitting the GC/Py/IRMS instrument

Inserting a chromatographic column GC2 for separating CO and $N_2$ generated by pyrolysis between the pyrolysis furnace and the IRMS to convert the GC/Py/IRMS to a GC/Py/GC/IRMS instrument.

step 2, preparing a sample

Simultaneously converting nitrate and nitrite in a natural sample to benzyl nitrate ($PhCH_2ONO_2$) and phenyl nitromethane ($PhCH_2NO_2$), respectively;

The specific process of step 2 is as follows:

step 2.1, obtaining $HNO_3$ and $HNO_2$ by anion exchange

Enriching nitrate and nitrite in the natural sample by adopting an anion exchange column, and then recovering the nitrate and nitrite ions by HCl to obtain $HNO_3$ and $HNO_2$ solutions, namely solution A;

step 2.2, converting the $HNO_3$ and the $HNO_2$ to an $AgNO_3$ and an $AgNO_2$

Adding $Ag_2O$ into the solution A, stirring until the pH value of the solution is 6-7 to obtain a $AgNO_3$ and $AgNO_2$ solution, namely solution B; freeze-drying the solution B to obtain a $AgNO_3$ and $AgNO_2$ solid; dissolving the $AgNO_3$ and the $AgNO_2$ in acetonitrile ($CH_3CN$), centrifuging to remove interferents insoluble in the acetonitrile ($CH_3CN$), to obtain a purified $AgNO_3$ and $AgNO_2$ acetonitrile solution, namely solution C, adding Ag$_2$O, stirring until the pH value of the solution is 6-7, and centrifuging to remove excess Ag$_2$O and insoluble substances to obtain a AgNO$_3$ and AgNO$_2$ solution;

step 2.3, converting AgNO$_3$, AgNO$_2$ into an organic ester and a nitro-compound respectively Adding benzyl bromide into the solution C; stirring for 1-5 h at room temperature to obtain an acetonitrile reaction solution of benzyl nitrate (PhCH$_2$ONO$_2$). phenyl nitromethane (PhCH$_2$NO$_2$) and residual benzyl bromide, namely solution D; wherein, the molar ratio of benzyl bromide to AgNO$_3$+AgNO$_2$ is greater than 1:1;

step 2.4, postprocessing

Centrifuging to remove AgCl precipitates in the solution D; Performing GC/MS analysis on the solution D to determine the concentrations of the components; diluting or concentrating the solution to bring the concentration to that required by the GC/Py/GC/IRMS analysis; storing in a brown container at 5° C.; wherein, the GC/Py/GC/IRMS analysis requires a concentration of 0.5 mg/ml to 1.0 mg/ml.

Step 3, simultaneously determining $\delta^{18}$O and $\delta^{15}$N in benzyl nitrate (PhCH$_2$ONO$_2$) and phenyl nitromethane (PhCH$_2$NO$_2$) by using the refitted instrument in the step 1; thus obtaining the $\delta^{18}$O and $\delta^{15}$N of the natural nitrate and nitrite indirectly;

The specific process of step 3 is as follows:

Setting GC/Py/GC/IRMS instrumentation parameters and analytical conditions, and testing a running in a CO mode when the instrument is stablized; after being separated by a chromatographic column GC1, benzyl nitrate and phenyl nitromethane are sequentially and respectively enter a pyrolysis furnace HTC, wherein oxygen is converted into CO, and nitrogen is converted into N$_2$; separating the mixed gas of CO and N$_2$ in a chromatographic column GC2, and sequentially performing IRMS analysis to obtain $\delta^{18}$O and $\delta^{15}$N isotope compositions of the benzyl nitrate and the phenyl nitromethane respectively;

Wherein, the chromatographic column GC1 is a medium-polarity or weak-polarity gas chromatographic column; specifically, the chromatographic column GC1 was HP-5, 5%-phenyl-methylpolysiloxane, 30 m in length and 0.25 mm in inner diameter.

The chromatographic column GC2 is of molecular sieve type; specifically, the chromatographic column GC2 was HP-Molseive, 10 m in length, 0.32 mm in inner diameter.

Embodiment 1

From 5 ml of Weihe river water insoluble impurities were filtered with a filter which had been washed with ultrapure water in advance, and then nitrate ions were enriched through an ion exchange column (column inner diameter 0.6 cm) containing 0.3 ml of anion exchange resin (Bio-Rad: AG1-X8, 200-400 mesh, chlorine form); eluted with 3 M HCl (3.5 ml), and eluent was collected; Ag$_2$O (about 1.2-1.5 g) was added into the eluent until the pH value of the reaction solution was 6-7, and filtered to obtain an AgNO$_3$ solution; freeze-dried to obtain AgNO$_3$ solid; the AgNO$_3$ solid (also soluble in acetonitrile if the sample contains AgNO$_2$) was dissolved with 0.3 ml of acetonitrile (CH$_3$CN) and the insoluble material (typically AgF, Ag$_2$SO$_4$, Ag$_3$PO$_4$, etc.) was removed by centrifugation.

Figure 13:
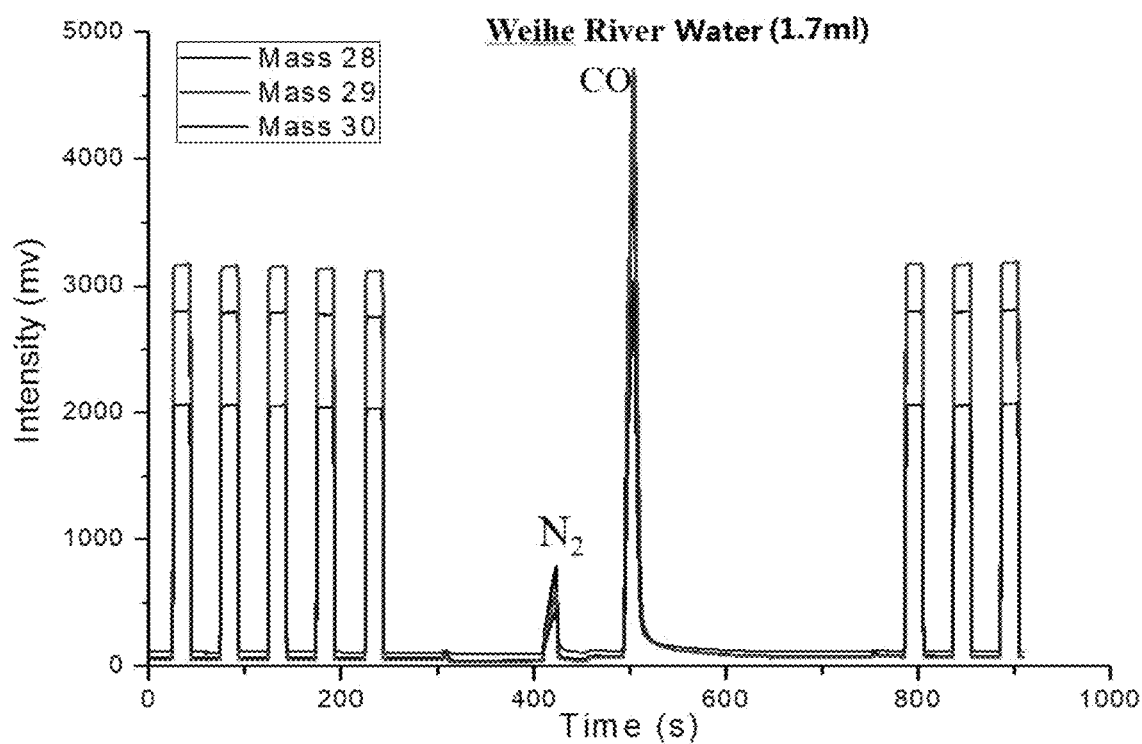
FIG. 13 shows the $\delta^{18}O$ and $\delta^{15}N$ obtained from Embodiment 1 of the method for simultaneous determination of nitrogen and oxygen isotope compositions of natural nitrate and nitrite according to the present disclosure.

Benzyl bromide (CAS: 100-39-0) was added into the AgNO$_3$ acetonitrile solution obtained above, wherein the molar amount of the benzyl bromide added was 1.5 times of the total molar amount of AgNO$_3$ and AgNO$_2$, stirred for 2 hours at room temperature, silver nitrate and silver nitrite were converted into benzyl nitrate (PhCH$_2$ONO$_2$), phenyl nitromethane (PhCH$_2$NO$_2$), and centrifuged to remove precipitated AgBr formed in the reaction solution; the reaction solution was diluted or concentrated to the concentration required for the GC/Py/GC/IRMS test (0.5 mg/ml to 1.0 mg/ml), stored in a brown bottle at 5° C., and $\delta^{18}$O and $\delta^{15}$N isotopic compositions of nitrate salt in Weihe River water were obtained by analysis, as shown in FIG. 13. wherein, the GC/Py/GC/IRMS condition settings were: He gas flow rate was 1.2 ml/min; sample inlet temperature: 180° C.; the temperature program of the first chromatographic column GC1 was starting at temperature of 50° C. (maintained for 2 min), then the temperature was increased to 150° C. at a rate of 15° C./min, then the temperature was increased from 150° C. to 290° C. at a rate of 35° C./min, and maintained at 290° C. for 2 min. The pyrolysis temperature was 1280° C., benzyl nitrate (PhCH$_2$ONO$_2$) and phenyl nitromethane (PhCH$_2$NO$_2$) were sequentially pyrolyzed. The chromatographic column GC2 for separating the pyrolysis gases, N$_2$ and CO is operated isothermally at room temperature without a temperature program.

Embodiment 2

Figure 14:
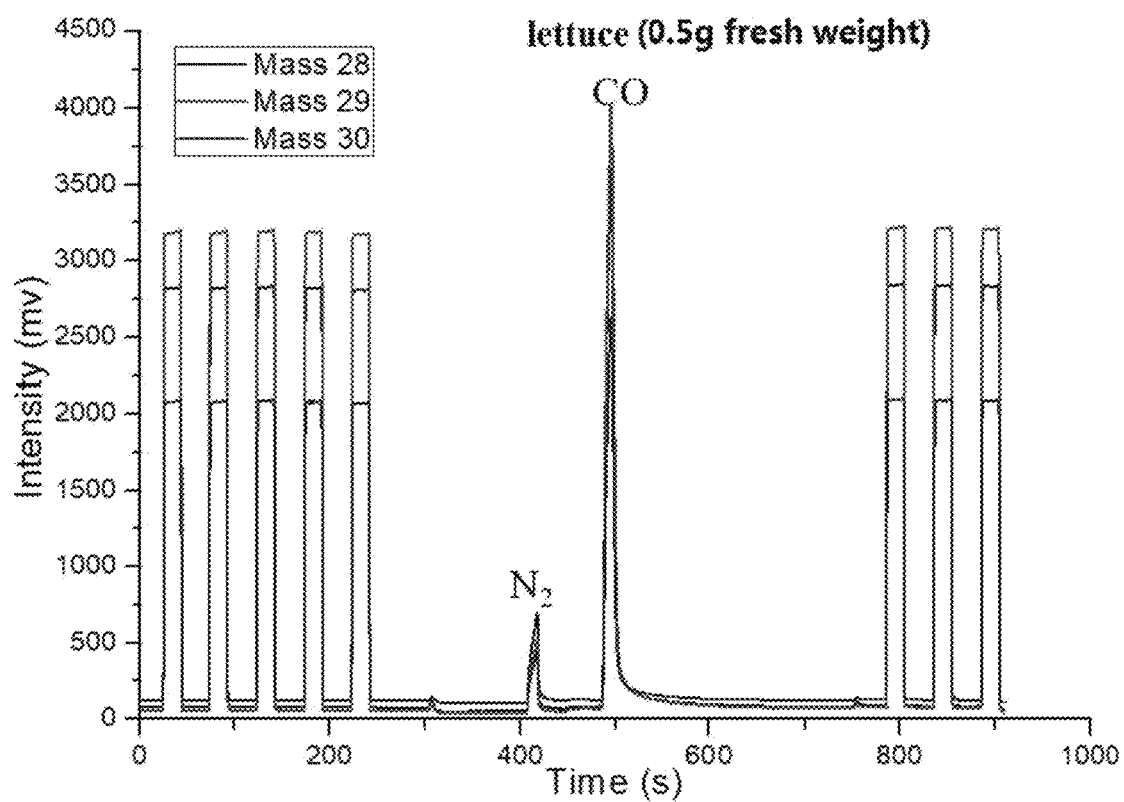
FIG. 14 shows the $\delta^{18}O$ and $\delta^{15}N$ obtained from Embodiment 2 of the method for simultaneous determination of nitrogen and oxygen isotope compositions of natural nitrate and nitrite according to the present disclosure.

Fresh lettuce was washed clean with ultrapure water and stored at −18° C. until further treatment. 0.5 g of lettuce was weighed, ground in a pre-cleaned mortar process to destroy cell walls, dissolved with 6-8 ml of deionized water, centrifuged or filtered to remove residues; the obtained water sample was treated with the same treatment steps as in Embodiment 1 to finally obtain $\delta^{18}$O and $\delta^{15}$N isotopic compositions of nitrate salt in leaves of lettuce, and the results are shown in FIG. 14.

Embodiment 3

Figure 15:
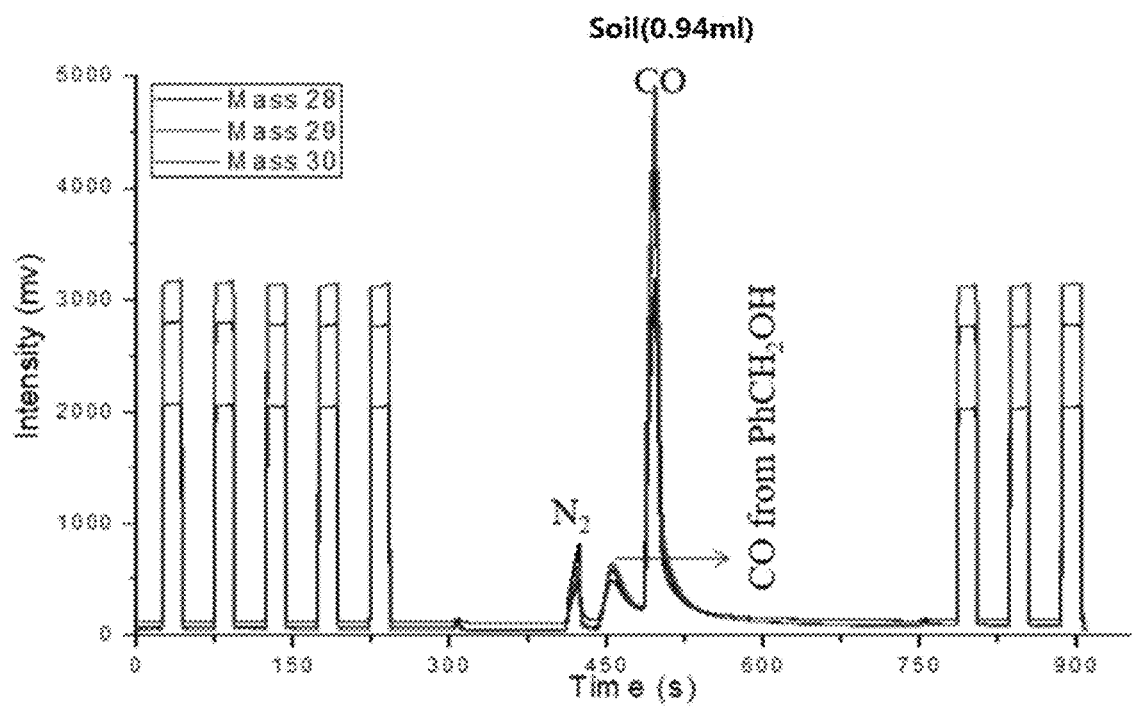
FIG. 15 shows the $\delta^{18}O$ and $\delta^{15}N$ obtained from Embodiment 3 of the method for simultaneous determination of nitrogen and oxygen isotope compositions of natural nitrate and nitrite according to the present disclosure.

10 g of collected fresh soil was added into a 250 ml conical flask, 50 ml of deionized water was added, shaken on a shaking table for 1 hour, ultrasonicated for 30 minutes, and centrifuged to obtain the centrifugal liquid after standing for 3 hours, treated 10 ml of the centrifugal liquid by the treatment step of Embodiment 1, and finally obtaining the $\delta^{18}$O and $\delta^{15}$N isotope compositions of nitrate salt in the soil, the results are shown in FIG. 15.

Embodiment 4

Figure 16:
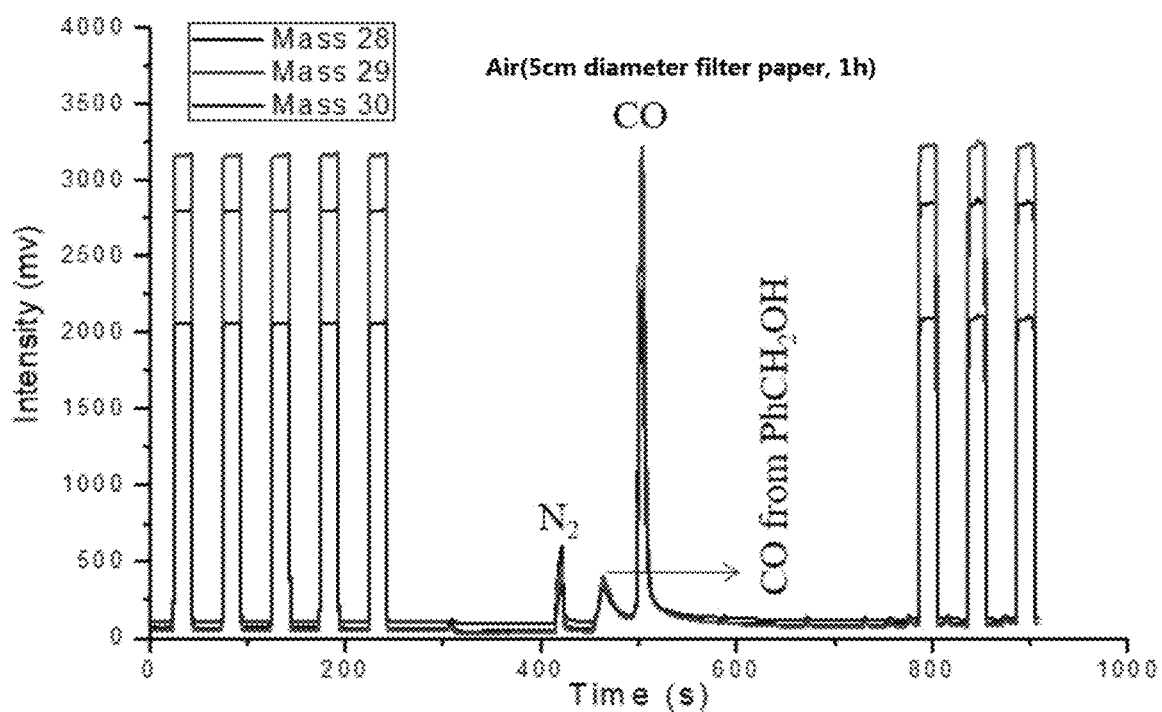
FIG. 16 shows the $\delta^{18}O$ and $\delta^{15}N$ obtained from Embodiment 4 of the method for simultaneous determination of nitrogen and oxygen isotope compositions of natural nitrate and nitrite according to the present disclosure.

Particulate matter in the atmosphere were collected by an air particle sampler (filter diameter 20 cm, large flow sampling for 24 hours), and then the collected air particulate matter was dissolved with 10 ml of deionized water (insoluble matter was removed by centrifugation), and the obtained water sample of the air particulate matter treated with the treatment steps of Embodiment 1 to obtain $\delta^{18}$O and $\delta^{15}$N isotopic compositions of nitrate salt in the air particles, the results are shown in FIG. 16.

Embodiment 5

From 80 ml of Xiamen offshore sea water, insoluble impurities were removed by using a filter which had been washed by ultrapure water, a sea water sample added to a glass column filled with 60 ml of cation exchange resin (732 styrene cation exchange resin, H form, form particle size 0.32-1.2 mm) was exchanged, Ag$_2$O (about 5.0-6.0 g) was added into the eluent until the pH value of the reaction solution was 6-7, and filtered to obtain AgNO$_3$ and AgNO$_2$ solution; after freeze-drying, AgNO₃ and AgNO₂ were dissolved in 0.3 ml of acetonitrile (CH₃CN) and the insoluble material removed by centrifugation.

Figure 17:
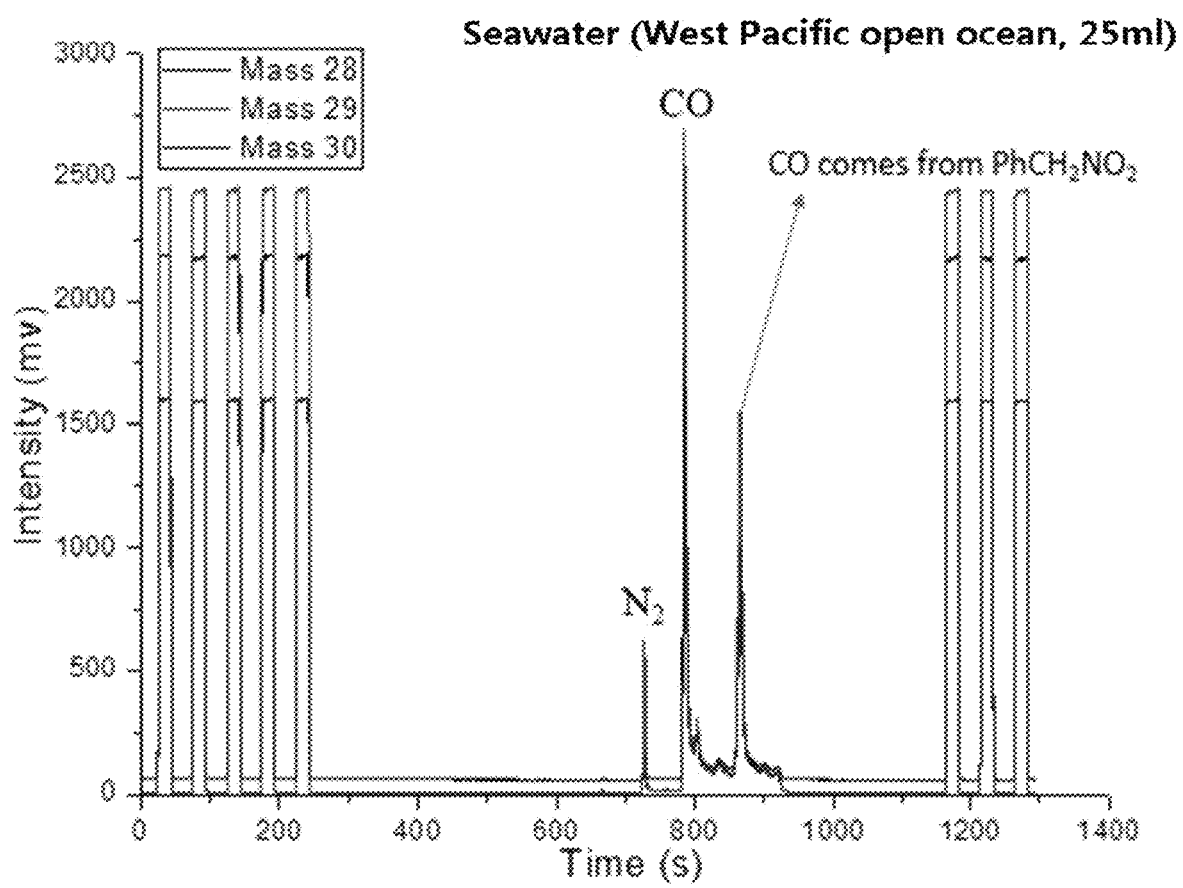
FIG. 17 shows the $\delta^{18}O$ and $\delta^{15}N$ obtained from Embodiment 5 of the method for simultaneous determination of nitrogen and oxygen isotope compositions of natural nitrate and nitrite according to the present disclosure.

Benzyl bromide (CAS: 100-39-0) was added into the AgNO₃ acetonitrile solution obtained above, wherein the molar amount of the benzyl bromide added was 1.5 times of the total molar amount of AgNO₃ and AgNO₂, stirred for 2 hours at room temperature, silver nitrate and silver nitrite were converted into benzyl nitrate (PhCH₂ONO₂), phenyl nitromethane (PhCH₂NO₂), and centrifuged to remove precipitated AgBr formed in the reaction solution; the reaction was diluted or concentrated as required for the GC/Py/GC/IRMS test (0.5 mg/ml to 1.0 mg/ml), stored in a brown bottle at 5° C., and $\delta^{18}O$ and $\delta^{15}N$ isotopic compositions of nitrate salt in Xiamen offshore sea water were obtained by isotopic analysis, as shown in FIG. 17.

Embodiment 6

From 5 ml of Weihe river water, insoluble impurities were removed with a filter which had been washed with ultrapure water in advance, and then nitrate ions were enriched through an ion exchange column (column inner diameter 0.6 cm) containing 0.3 ml of anion exchange resin (Bio-Rad: AG1-X8, 200-400 meshes, chlorine form); eluted with 3 M HCl (3.5 ml), and eluent was collected; Ag₂O (about 1.2-1.5 g) was added into the eluent until the pH value of the reaction solution was 6-7, and filtered to obtain a AgNO₃ solution; freeze-dried to obtain AgNO₃ solid; the AgNO₃ solid (also soluble in acetonitrile if the sample contains AgNO₂) was dissolved with 0.3 ml of acetonitrile (CH₃CN) and the insoluble material (typically AgF, Ag₂SO₄, Ag₃PO₄, etc.) was removed by centrifugation.

Figure 18:
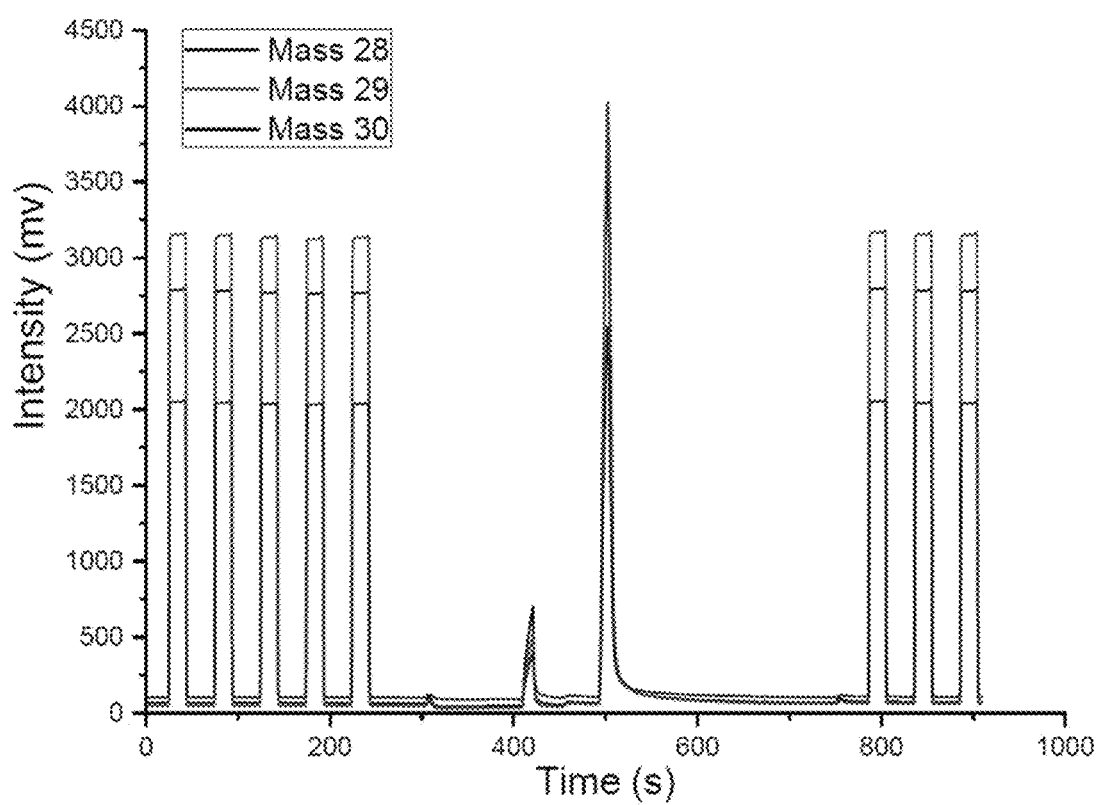
FIG. 18 shows the $\delta^{18}O$ and $\delta^{15}N$ obtained from Embodiment 6 of the method for simultaneous determination of nitrogen and oxygen isotope compositions of natural nitrate and nitrite according to the present disclosure.

2-Phenyl chloroethane was added into the AgNO₃ acetonitrile solution obtained above, wherein the molar amount of the added 2-phenyl chloroethane was 1.5 times that of the total molar amount of AgNO₃ and AgNO₂, stirred for 2 hours at room temperature, silver nitrate and silver nitrite were converted into 2-phenyl ethyl nitrate (PhC₂H₂CH₂ONO₂), 2-phenyl nitroethane (PhC₂H₂CH₂NO₂), and centrifuged to remove the precipitated AgCl formed in the reaction solution; the reaction solution was diluted or concentrated as required for the GC/Py/GC/IRMS test (0.5 mg/ml to 1.0 mg/ml), stored in a brown bottle at 5° C., and $\delta^{18}O$ and $\delta^{15}N$ until analysed to determine the isotopic compositions of nitrate salt in Weihe River water, as shown in FIG. 18.

Embodiment 7

From 5 ml of Weihe river water, insoluble impurities were filtered with a filter which had been washed with ultrapure water in advance, and then nitrate ions were enriched through an ion exchange column (column inner diameter 0.6 cm) containing 0.3 ml of anion exchange resin (Bio-Rad: AG1-X8, 200-400 mesh, chlorine form); eluted with 3 M HCl (3.5 ml), and eluent was collected; Ag₂O (about 1.2-1.5 g) was added into the eluent until the pH value of the reaction solution is 6-7, and filtered, to obtain an AgNO₃ solution; freeze-dried to obtain AgNO₃ solid; dissolved with 0.3 ml of ethanol (CH₃CH₂OH), only a small amount of AgNO₃ and AgNO₂ dissolved, and a large amount of AgNO₃ and AgNO₂ were removed by centrifugation as precipitates, resulting in a large sample loss, eventually failing to obtain enough benzyl nitrate (PhCH₂ONO₂) and phenyl nitromethane (PhCH₂NO₂) for analysis. According to the rule of solubility, since a small amount of AgNO₃ and AgNO₂ are dissolved, it is indicated that AgNO₃ and AgNO₂ can be dissolved in ethanol, so continuing to increase the amount of ethanol should enable AgNO₃ and AgNO₂ to be sufficiently dissolved, but, ethanol will affect the test results in the next test.

The principle and influencing factors of the method for simultaneously determining nitrogen and oxygen isotope compositions of natural nitrate and nitrite of the present application will be described below.

I. Chemical Transformation of Silver Nitrate and Silver Nitrite

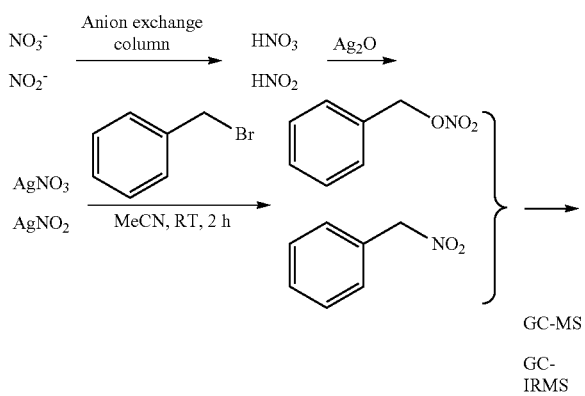

II. Background of Instrument Improvement

The method of the present disclosure can be carried out in a GC/Py/IRMS system currently commercially available (e.g., Thermofisher Scientific Trace GC 1300/Conflow IV/IlsoLink/MAT 253 plus). However, the present GC/Py/IRMS has no capacity to separate the components of the pyrolysis gas, while the IRMS obtains the oxygen isotope composition ($\delta^{18}O$) by analyzing the mass-to-charge ratio (m/z) of different mass number combinations of CO, and obtains the nitrogen isotope composition ($\delta^{15}N$) by analyzing the mass-to-charge ratio (m/z) of different mass number combinations of N₂. Since m/z of different mass number combinations of N₂ and CO partially overlap, if N₂ and CO produced by pyrolysis cannot be separated, they will interfere with each other, and accurate results cannot be obtained. Therefore, in order to avoid interference of both N₂ and CO with each other and simultaneously analyze $\delta^{18}O$ and $\delta^{15}N$, the present GC/Py/IRMS instrument was retrofitted with a chromatographic column GC2 (shown in FIG. 3) between the pyrolysis furnace (HTC, high temperature conversion unit) and the IRMS to separate the CO and N₂ gases from pyrolysis. After benzyl nitrate and phenyl nitromethane are separated by a chromatographic column GC1, sequentially and respectively enter a pyrolysis furnace HTC, wherein oxygen is converted into CO, and nitrogen is converted into N₂; separating the mixed gas of CO and N₂ in a chromatographic column GC2, and sequentially performing IRMS analysis to obtain $\delta^{18}O$ and $\delta^{15}N$ isotope compositions of benzyl nitrate and phenyl nitromethane.

Figure 3:
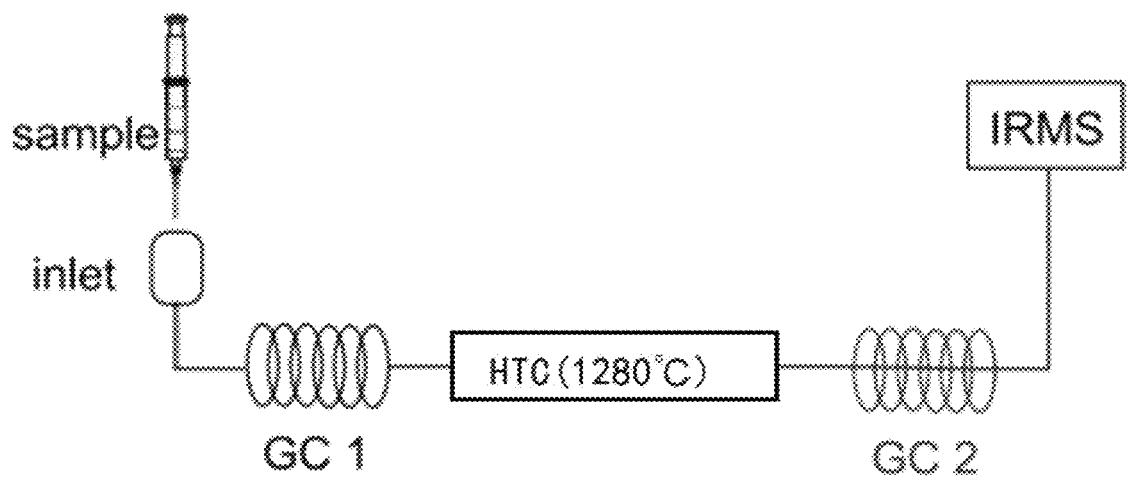
FIG. 3 is a schematic diagram of a GC/Py/GC/IRMS instrument in step 1 of a method for simultaneous determination of nitrogen and oxygen isotope compositions of natural nitrate and nitrite according to the present disclosure.
Figure 4:
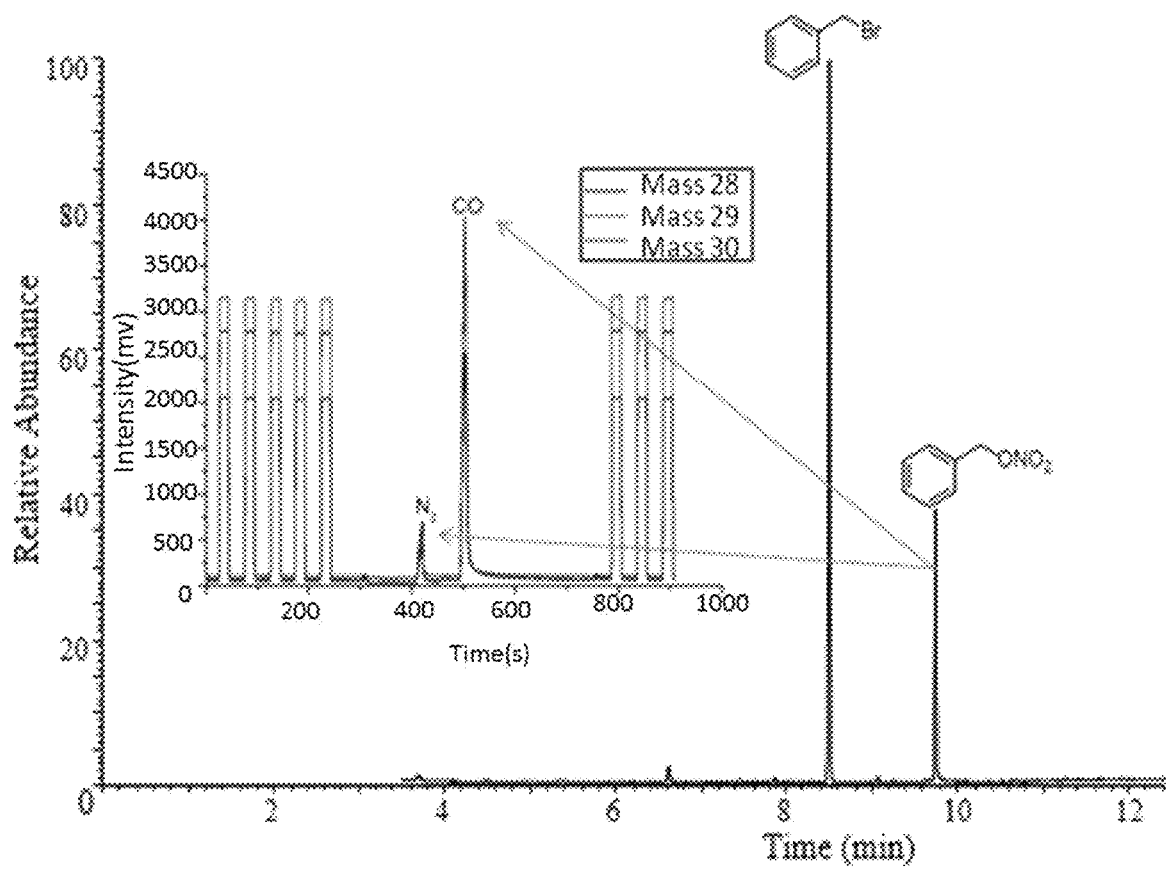
FIG. 4 is a GC/MS spectrum juxtaposed with a GC/Py/GC/IRMS spectrum of the benzyl nitrate pyrolysis product in the method for simultaneous determination of nitrogen and oxygen isotopic compositions of natural nitrate and nitrite according to the present disclosure.

All standard and sample analyses were tested on a modified instrument GC/Py/GC/IRMS (shown in FIG. 3). Typically, a medium-polarity or weak-polarity gas chromatographic column GC1 (e.g. HP-5, 5%-phenylmethylpolysiloxane, 30 m in length and 0.25 mm in inner diameter) can be used for separating the compounds in the reaction system after the third conversion step. Taking HP-5 as an example, the gas chromatography parameters and analytical conditions were as follows: He gas flow rate was 1.2 ml/min; sample inlet temperature: 180° C.; the temperature program was starting at temperature of 50° C. (maintained for 2 min), then the temperature was increased to 150° C. at a rate of 15° C./min, then the temperature was increased from 150° C. to 290° C. at a rate of 35° C./min, and maintained at 290° C. for 2 min. The chromatographic column GC2 for separating the $N_2$, CO pyrolytic gases and the like is generally of a molecular sieve type (such as: HP-Molseive, 10 m in length, 0.32 mm in inner diameter), operated isothermally at room temperature without a temperature program. FIG. 4 shows GC/MS and GC/Py/GC/IRMS spectra of the product after conversion of nitrate salt into nitrate ester.

III. Analytical Procedures

Setting instrument parameters and analytical conditions, and finishing sample testing in a CO mode (O analysis mode) after the instrument is stable. The true $\delta^{18}O$ value of the sample can be read directly from the software that operates IRMS (e.g., Thermo Scientific Inc ISODAT) according to m/z 28 and 30 currents. The true $\delta^{15}N$ value of the sample can be obtained by analyzing the peak areas of m/z 28 and 29 of the $N_2$ peak and using the quantitative relationship between the true isotope value and the measured isotope value of the reference substance (USGS32: $\delta^{18}O$=25.7 mUr, $\delta^{15}N$=180 mUr; USGS34: $\delta^{18}O$=−27.9 mUr, $\delta^{15}N$=−1.8 mUr; USGS35: $\delta^{18}O$=57.5 mUr, $\delta^{15}N$=2.7 mUr).

IV. Various Indexes of the Method of the Present Disclosure

(1) Conversion Rate

Preparing a 12.0 mg/L aqueous solution of potassium nitrate, and converting the potassium nitrate into nitrate ester by using the disclosure; firstly, converting 0.5 L of a potassium nitrate water sample (6.0 mg) into silver nitrate (10.1 mg should be obtained, 10.0 mg actually obtained, conversion rate 10.0/10.1×100% =99%), and then converting the silver nitrate (10.0 mg) into nitrate ester (9.0 mg should be obtained, 8.6 mg actually obtained, conversion rate 8.6/9.0×100%=95.5%); the two-step conversion was near quantitative and did not result in isotopic fractionation.

(2) Pyrolysis Efficiency, Linear Range, Accuracy and Precision

Figure 5:
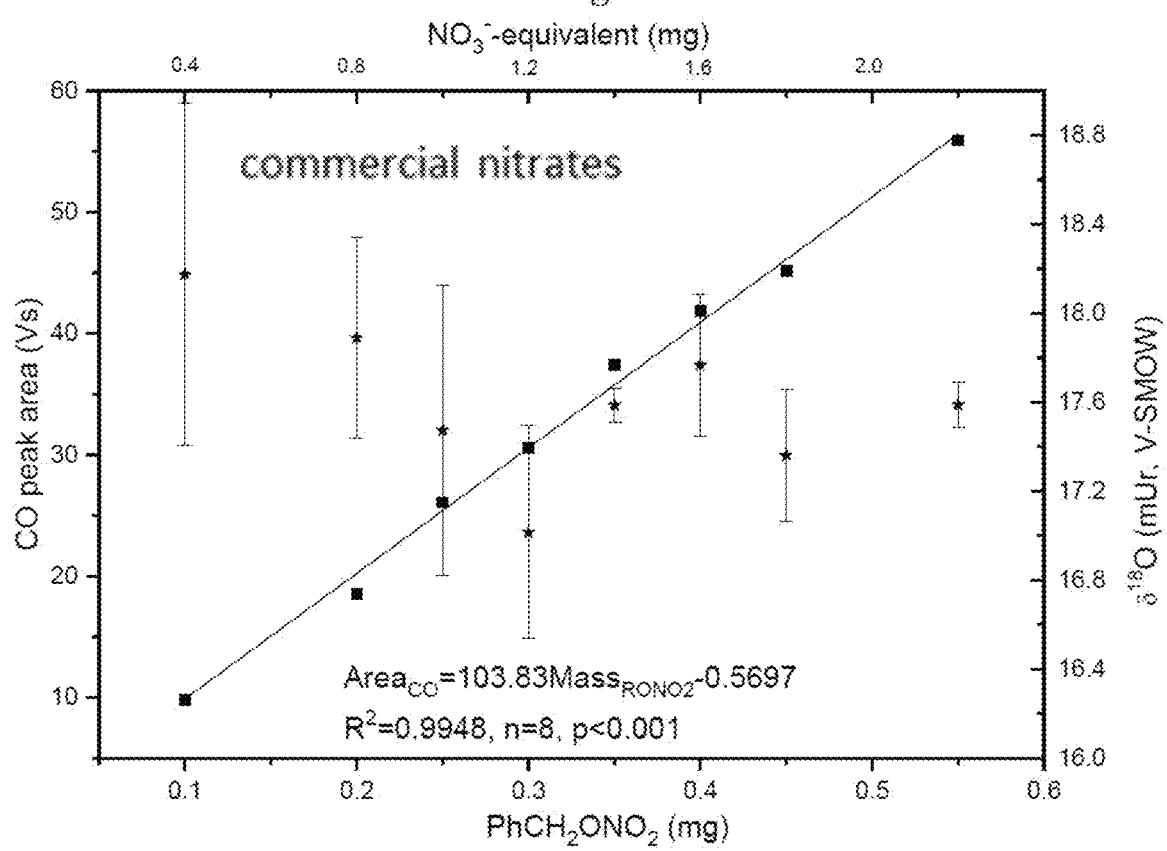
FIG. 5 shows the thermal conversion efficiency and linear range based on the prior art EA/Py/IRMS (elemental analysis/pyrolysis/isotope ratio mass spectrometry) method in comparison to the method for simultaneous determination of nitrogen and oxygen isotope compositions of natural nitrate and nitrite according to the present disclosure.
Figure 6:
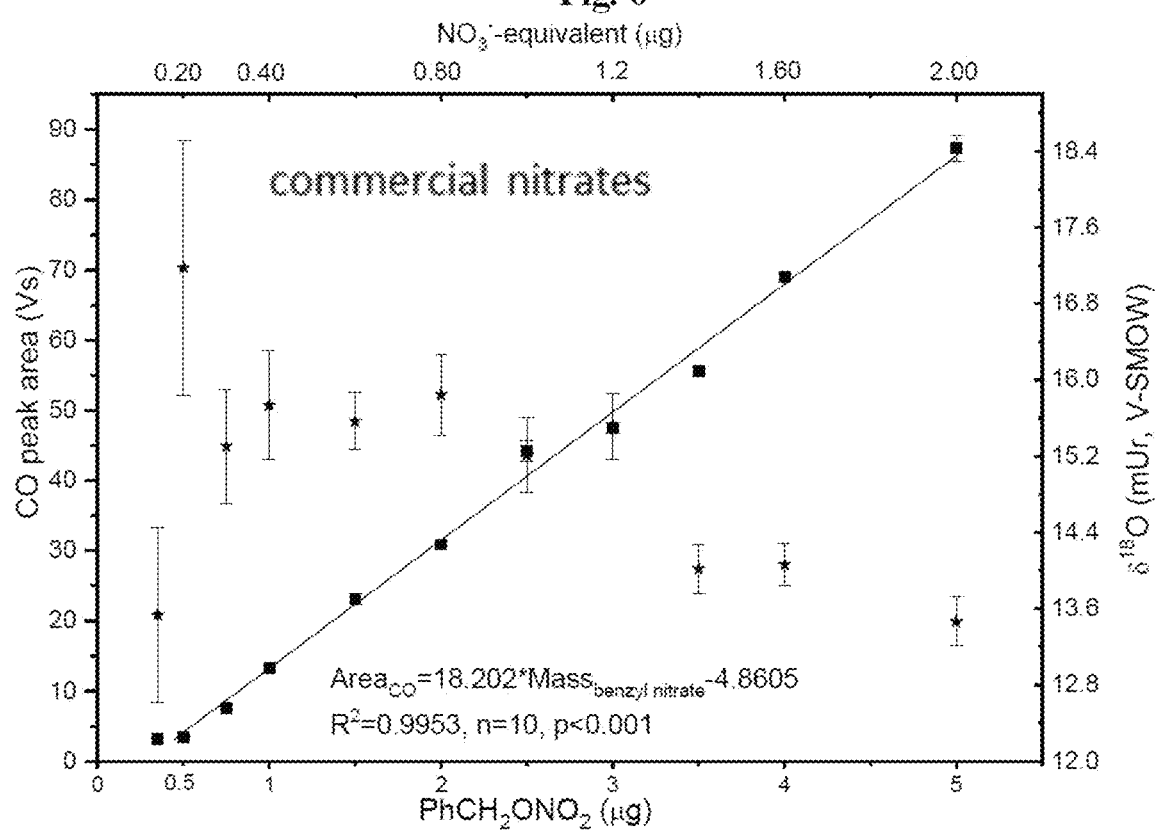
FIG. 6 shows thermal conversion efficiency and linear range based on GC/Py/GC/IRMS in the method for simultaneous determination of nitrogen and oxygen isotopic compositions of natural nitrate and nitrite according to the present disclosure.

As shown in FIGS. 5 and 6, at 0.4-2.5 mg $NO_3^-$, the traditional method based on EA/Py/IRMS has high pyrolysis efficiency, accuracy and precision in the sample size range; the linear range GC/Py/GC/IRMS of the present disclosure is 0.3-2.0 μg $NO_3^{3-}$ (calculated by $RONO_2$). The sample consumption of the disclosure is small, and reliable data can be obtained with 10 nmol of $NO_3^-$ (0.6 μg), and the method is also applicable to low concentration samples (1-10 μM).

(3) $CO_2$ Generation

Figure 7:
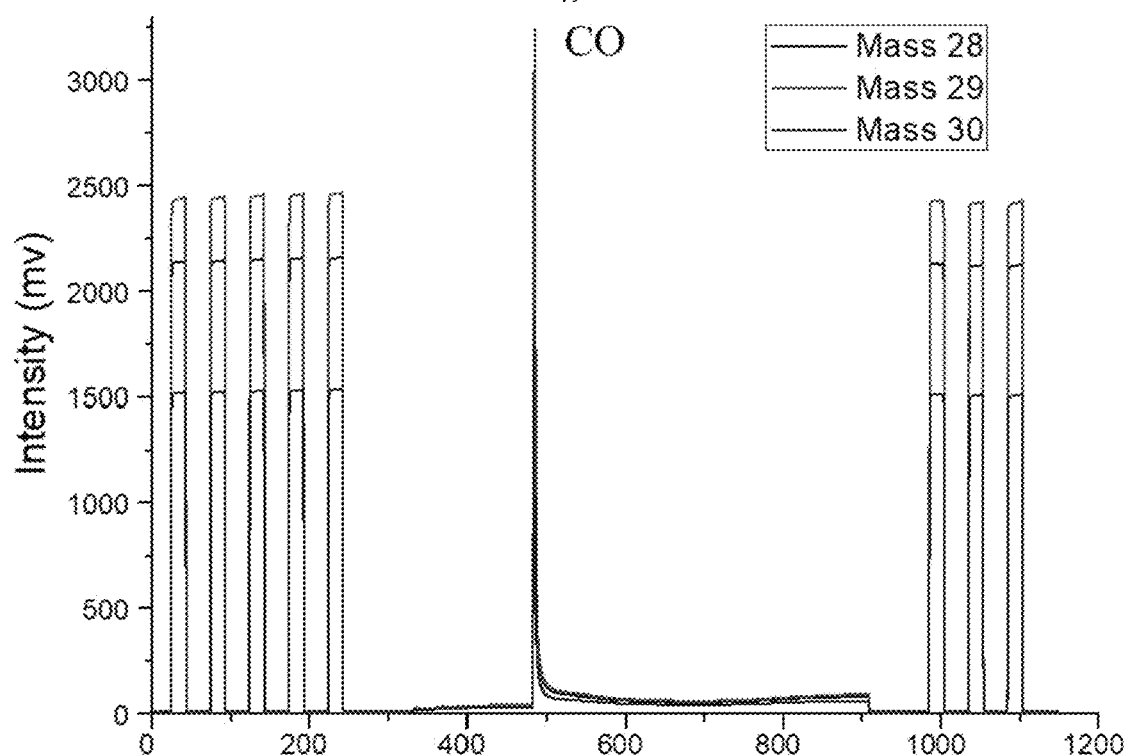
FIG. 7 shows the amount of CO formed during pyrolysis in the method for simultaneous determination of nitrogen and oxygen isotopic compositions of natural nitrate and nitrite according to the present disclosure.
Figure 8:
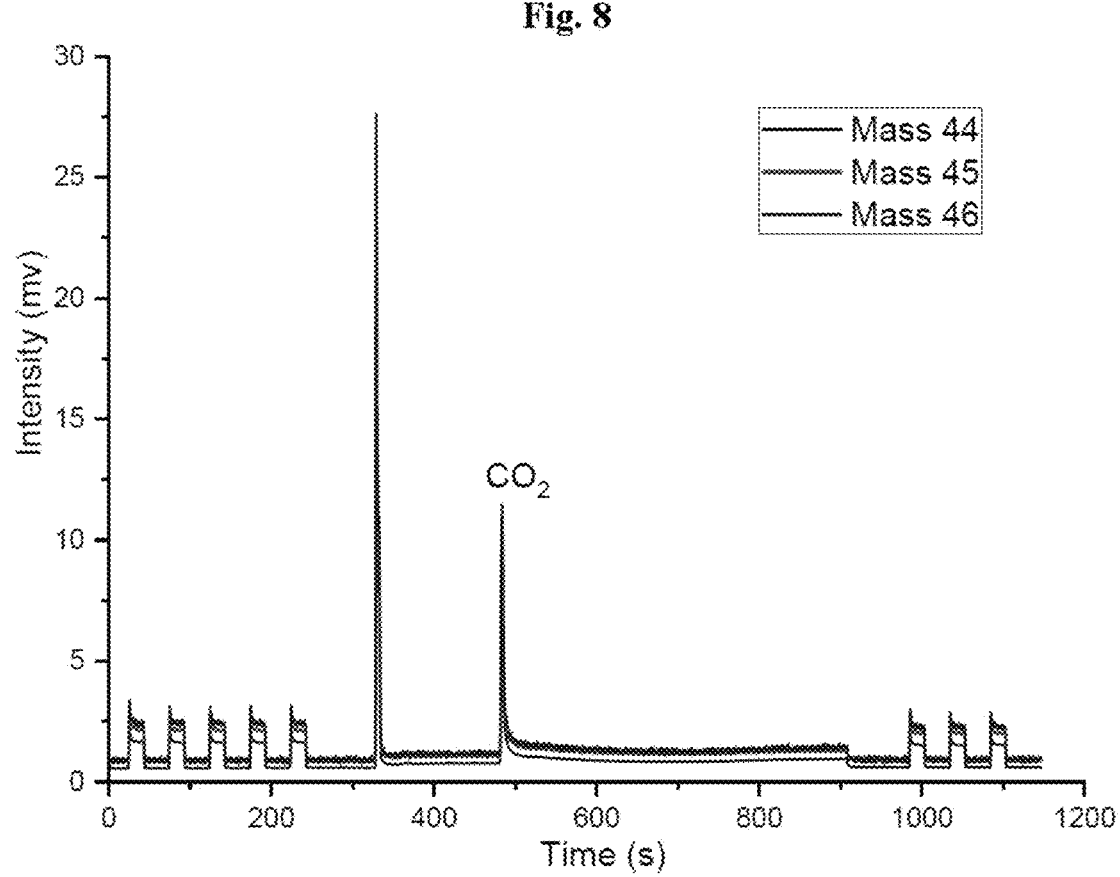
FIG. 8 shows the amount of $CO_2$ formed during pyrolysis in the method for simultaneous determination of nitrogen and oxygen isotopic compositions of natural nitrate and nitrite according to the present disclosure.

As shown in FIGS. 7 and 8, the quantity of $CO_2$ produced as a byproduct of the pyrolysis process is very small (<1%), indicating that most of the O in $RONO_2$ is converted into CO which can be analysed by the instrument, so that the oxygen isotope fractionation caused by $CO_2$ can be neglected, simplifying the analysis and improving its reliability.

(4) Stability

Figure 9:
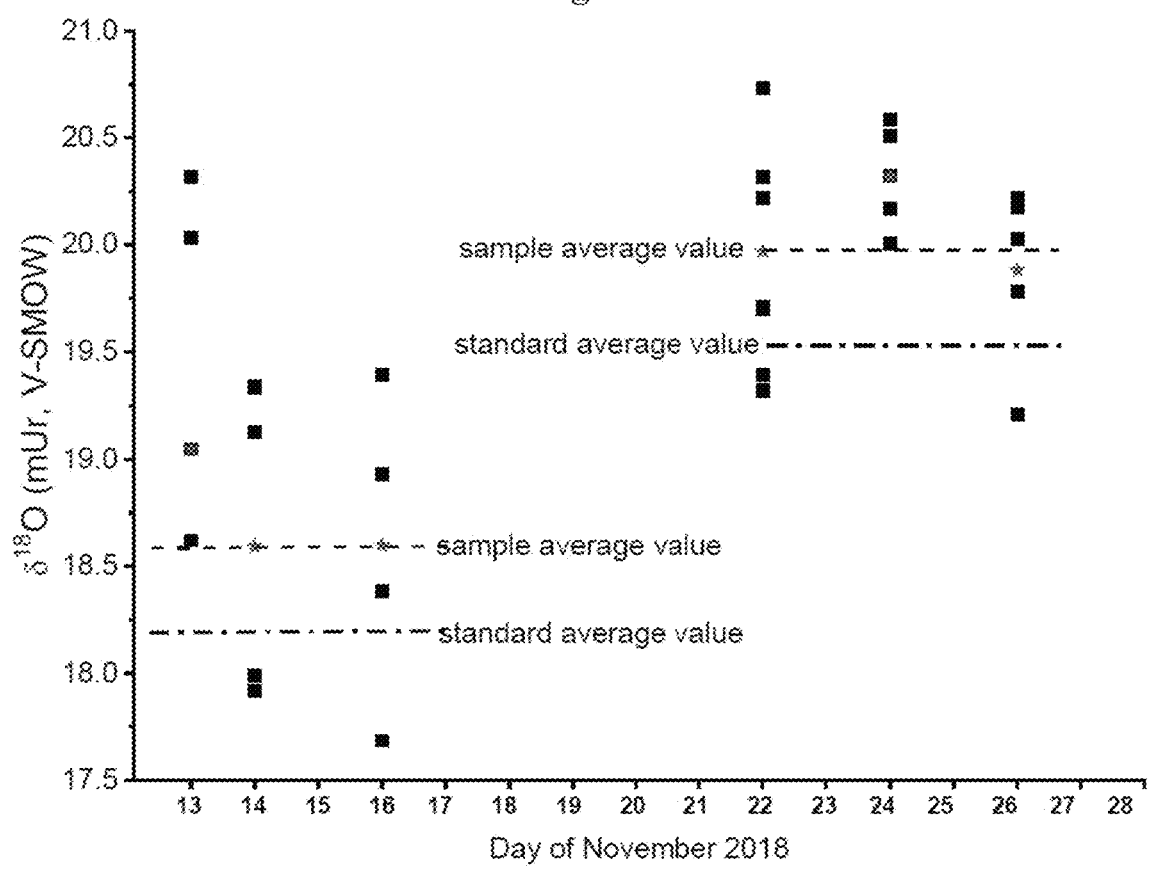
FIG. 9 shows the chemical and isotopic stability of nitrate ester in a method for simultaneous determination of nitrogen and oxygen isotopic compositions of natural nitrate and nitrite according to the present disclosure.

As shown in FIG. 9, the nitrate ester is stable for at least two weeks, such that the measured isotope ratios are basically unchanged, so that it is not necessary to perform the isotopic analysis immediately (following derivatization). The result is still reliable and accurate after the nitrate ester is stored for a period of time.

(5) Reproducibility

The standard error of three repeated analyses is <0.26 mUr, which is less than the instrument analysis error <0.35 mUr, indicating that the method has high reproducibility; the specific data is shown in Table 1:

TABLE 1

Reproducibility and Analysis Errors

| $NO_3^+$ | $\delta^{18}O$-corrected | | standard deviations | number of replication |
|---|---|---|---|---|
| USGS 34 | repeat 1 | −27.58 | 0.24 | 7 |
| −27.9 mUr | repeat 1 | −27.25 | 0.31 | 7 |
| | repeat 2 | −27.84 | 0.27 | 7 |
| Weibe River water | repeat 1 | 1.34 | 0.33 | 7 |
| | repeat 2 | 1.31 | 0.29 | 7 |
| | repeat 3 | 1.28 | 0.21 | 7 |

(6) Isotope Effect a) Isotopic Fractionation Due to Ion Exchange and Neutralization

Potassium nitrate was dissolved in and eluted from the anion exchange column with HCl solution prepared with three waters with a $\delta^{18}O$ span of up to 43 mUr. Isotopic compositions of the potassium nitrate before and after the processing were then analysed by EA/Py/IRMS and compared. It was found that the maximum variation in the $\delta^{18}O$ values from samples being prepared in water with different isotopic composition was only 1.3 mUr (see Table 2). Given that the variation in $\delta^{18}O$ of water used for sample preparation is generally consistent, the isotope effect caused by anion exchange and neutralization is negligible, indicating that the two-step chemical conversion process will not cause oxygen isotope fractionation, ensuring the reliability of the final test results,

TABLE 2

Isotopic Effects of Ion Exchange and Neutralization Reaction

| $\delta^{18}O$ of original $KNO_3$ | AIE medium $\delta^{18}O$ | recovered $KNO_3$ as $AgNO_3$ | standard deviation |
|---|---|---|---|
| −4.41 | | | 0.32 |
| | 0.4 | −4.50 | 0.44 |
| | 19.2 | −5.85 | 0.78 |
| | 43.5 | −5.80 | 0.46 | b) Isotopic Correlation Before and After Chemical Transformation

Figure 10:
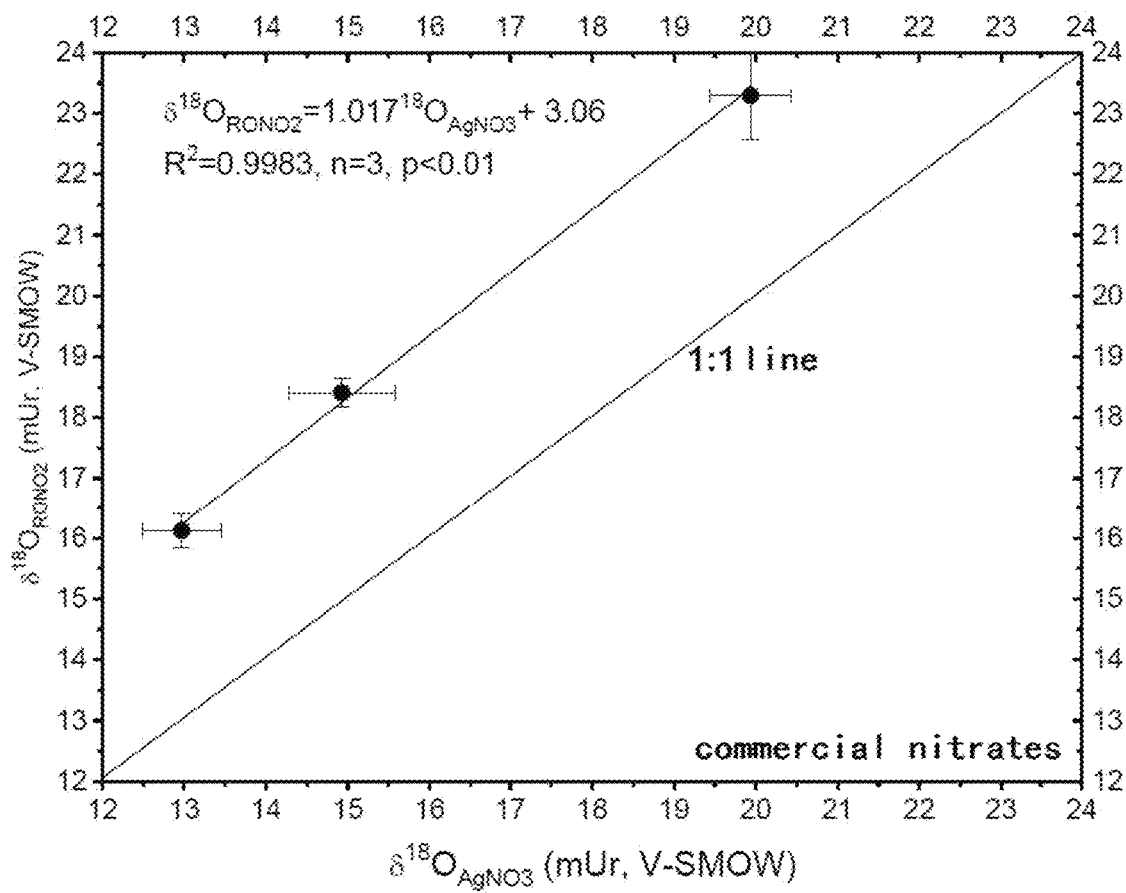
FIG. 10 shows the isotope effect of chemical conversion of silver nitrate into nitrate ester in the method for simultaneous determination of nitrogen and oxygen isotope compositions of natural nitrate and nitrite according to the present disclosure.
Figure 11:
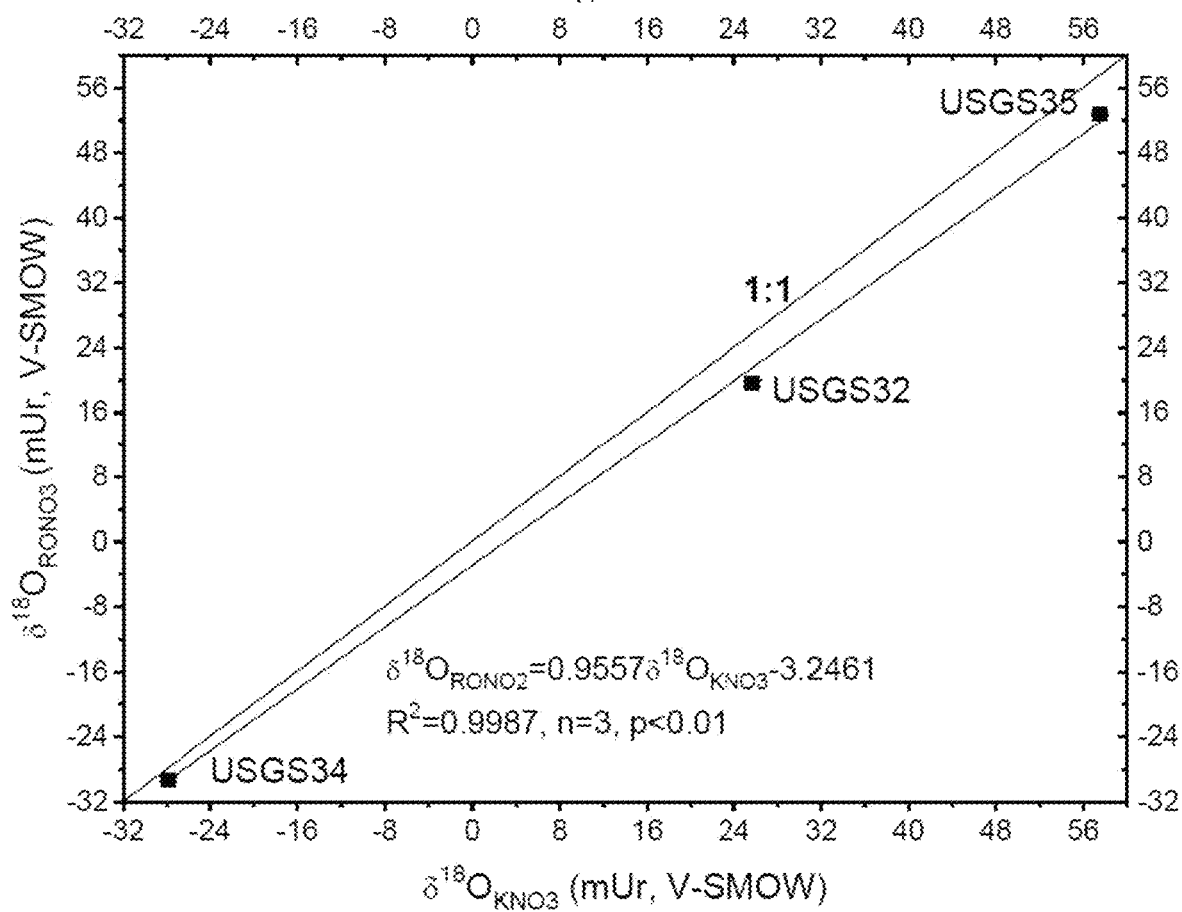
FIG. 11 shows the oxygen isotope effect of chemical conversion of potassium nitrate standard into nitrate ester in the method for simultaneous determination of nitrogen and oxygen isotope compositions of natural nitrate and nitrite according to the present disclosure.
Figure 12:
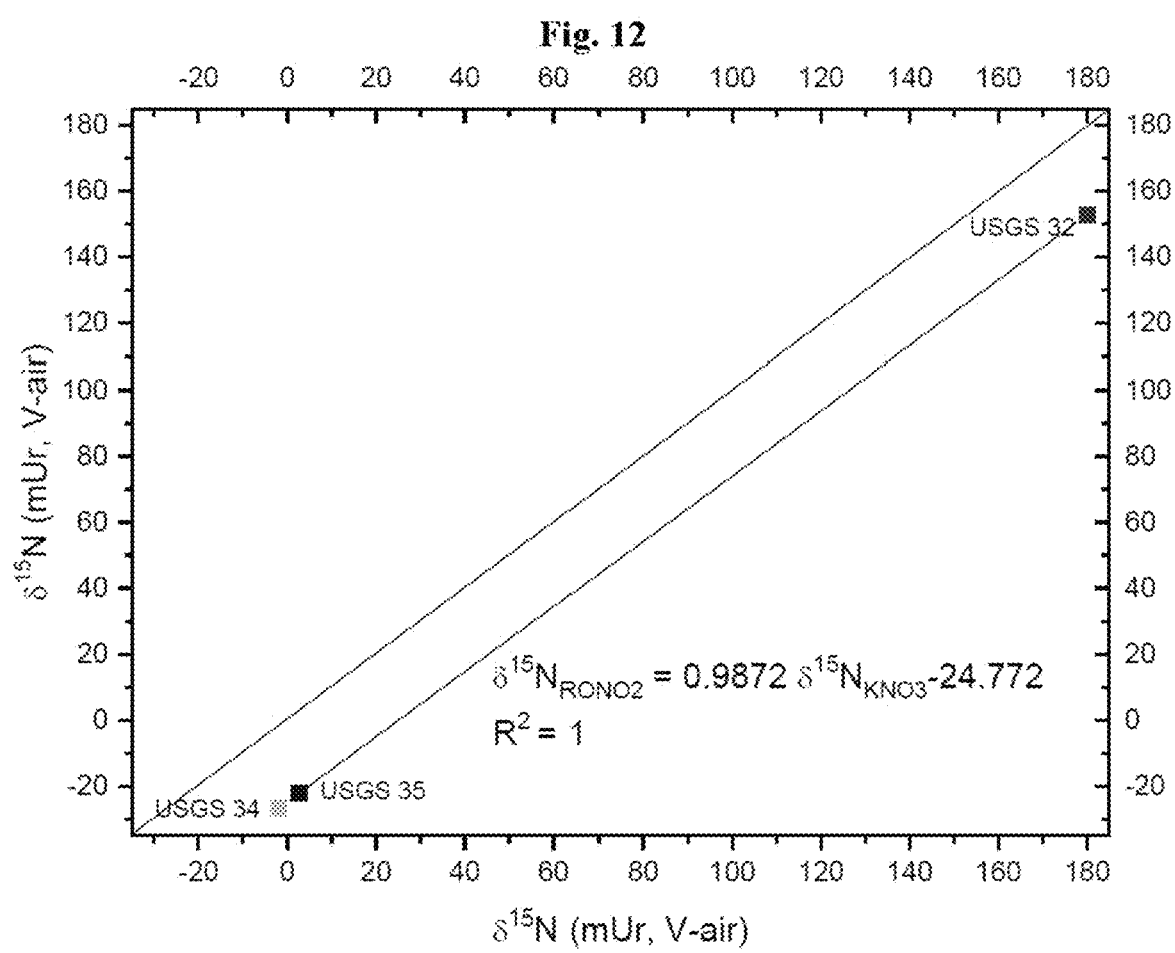
FIG. 12 shows the nitrogen isotope effect of chemical conversion of a potassium nitrate standard into a nitrate ester in a method for simultaneous determination of nitrogen and oxygen isotope compositions of natural nitrate and nitrite according to the present disclosure.

As shown in FIG. 10, the correlation between silver nitrate $\delta^{16}O$ measured with EA/Py/IRMS and benzyl nitrate $\delta^{18}O$ measured with GC/Py/GC/IRMS was very high. This indicates that oxygen isotope fractionation caused in the process of converting silver nitrate to nitrate ester in the last step can be negligible, ensuring the reliability of the final test results.

c) The Correlation Between the Whole Process Measurement Value and the Real Value As shown in FIGS. 11 and 12, three potassium nitrate standards with known $\delta^{18}O$ and $\delta^{15}N$ (USGS32, USGS34, USGS35) were converted to the corresponding benzyl nitrate using this method and then testing $\delta^{18}O$ and $\delta^{15}N$ again. For both $\delta^{18}O$ and $\delta^{15}N$, the correlation before and after conversion are very good, indicating that the test results of this method are accurate and reliable, and no oxygen and nitrogen isotope fractionation is caused.

V. Comparison of the Method of the Present Disclosure with the Prior Art

As shown in Table 3:

TABLE 3

Comparison between the Present Disclosure and Current Popular Methods

| Comparative items | Organic Nitrate/Nitrite | Bacterial Denitrification to $N_2O$ | Chemical Reduction | Anion ion-exchange to $AgNO_3$ |
|---|---|---|---|---|
| Authors/Inventors | Wang et al. (2019) | Sigman et al. (2001) Casciotti et al. (2002; 2007) Böhlke et al. (2007) | McIlvin et al. (2005) Wassenaar et al. (2018) Altabet et al. (2019) | Chang et al. (1999) Silva et al. (2000) |
| Required instrument platform | GC/IRMS | Gasbench/IRMS | Gasbench/IRMS or IRIS | EA/IRMS |
| Analysis object | $RONO_2$ Liquid, convenient to operate | $N_2O$ Gas, inconvenient to operate | $N_2O$ Gas, inconvenient to operate | CO or $CO_2$ Gas, inconvenient to operate |
| $\delta^{18}O$ precision | 0.2 mUr | 0.13-0.59 (0.34) mUr | 0.3 mUr | 0.5 mUr |
| O Loss, Acquisition, Exchange and Fractionation Problems | NO | YES | YES | YES |
| N Loss, Acquisition, Exchange and Fractionation Problems | NO | YES | YES | NO |
| Matrix blank effect | NO | YES | YES | NO |
| Accuracy/reproducibility | Good | Good | Good | Good |
| Stability | Good | Good | Good | Good |
| Sample consumption | 0.2 μg (no concentration requirement) | 0.6 μg (concentration 1 μM or above) | 3.5 μM (50 ppb) | 2 mg (no concentration requirement) |
| Sample preparation time | 2 hr | 6-10 d | 1-2 d | 3 d |
| Suitable for high salt sample | ✓ | ✓ | ✓ | x |
| Simultaneous determination of nitrate salt and nitrite salt | ✓ | x | x | x |
| Simultaneous determination of $\delta^{15}N$ and $\delta^{18}O$ | ✓ | x | x | x |
| Whether can be automated | ✓ | ✓ | ✓ | x |
| Whether can be extended to $\delta^{17}O$ | ✓ | ✓ | ✓ | x |
| Cost (chemical treatment) | 7 RMB/sample | unknown | 15 RMB/sample | 500 RMB/sample |

As can be seen from the above table, the disclosure innovates the current determination method of $^{18}O$ and $^{15}N$ of nitrate and nitrite, and realizes that:

simultaneously analyzing O and N isotope ratios in nitrate salt and nitrite salts;

wide application range, the method is suitable for all types of samples such as fresh water, sea water, animals and plants, soil and air;

greatly reduced sample consumption, open ocean seawater which cannot be successfully analyzed due to low concentration and high salinity in the past, snow water in north and south poles, high-altitude precipitation, clean air particle samples and the like, can be analysed;

suitable for analysis of samples collected in the field;

easy to realize the automation of sample processing, saving time, manpower, material and cost; and simplifying the determining process;

combined with GC/IRMS automatic sampling, it can continuously analyze a large number of samples without interruption, providing an unparalleled and innovative analytical tool for the analysis of $\delta^{18}O$ and $\delta^{15}N$ of nitrate and nitrite.

The above are only preferred embodiments of the present disclosure and are not intended to limit the present disclosure. For those skilled in the art, the present disclosure may be subject to various modifications and changes. Any modification, equivalent replacement, improvement, etc. made within the spirit and principle of the present disclosure should be included in the protection scope of the present disclosure.

What is claimed is:

1. A system for simultaneous determination of nitrogen and oxygen isotope compositions in nitrate and nitrite, wherein the system comprises:
    a nitrate and nitrite enrichment unit, configured for enriching the nitrate and the nitrite in a sample to be detected in the form of a $HNO_3$ and a $HNO_2$ to form an enrichment solution;
    a chemical conversion unit, interfaced to the nitrate and nitrite enrichment unit and configured for converting the $HNO_3$ to a $RONO_2$, converting the $HNO_2$ to a $RNO_2$, wherein the R is a $C_1$-$C_{20}$ alkyl group with or without an aryl substituent of 6-12 carbons;
    a first gas chromatography separation unit, connected with a chemical conversion unit and configured for separating the $RONO_2$ and the $RNO_2$;
    a pyrolysis unit, connected to the first gas chromatography separation unit and configured for pyrolyzing the $RONO_2$ and the $RNO_2$ to obtain pyrolysis gases, respectively containing CO and $N_2$;
    a second gas chromatography separation unit, connected with the pyrolysis unit and configured for separating the CO and the $N_2$ in each pyrolysis gas; and
    an isotope ratio mass spectrometry test unit, interfaced with the second gas chromatography separation unit, configured for performing $\delta^{18}O$ and $\delta^{15}N$ isotope analysis on the CO and the $N_2$.

2. The system according to claim 1, wherein the chromatographic column of the first gas chromatographic separation unit is a first chromatographic column which is a medium-polarity gas chromatographic column or a weak-polarity gas chromatographic column; and the first chromatographic column is an HP-5 chromatographic column filled with 5%-phenyl -methyl polysiloxane, or a DB-HeavyWAX chromatographic column filled with polyethylene glycol.

3. The system according to claim 1, wherein the chromatographic column of the second gas chromatographic separation unit is a second chromatographic column, the second chromatographic column is a molecular sieve type chromatographic column, and the second chromatographic column is an HP-Molesieve chromatographic column, or an HP-PLOT Q chromatographic column.

4. The system according to claim 1, wherein the nitrate salt and nitrite salt enrichment unit comprises:
    an anion exchange column, configured for enriching anions in the sample to be detected; and
    a hydrochloric acid supply device, connected with the ion exchange column and configured for washing the anion exchange column to obtain the enrichment solution containing $HNO_3$ and $HNO_2$, and wherein a filling resin of the anion exchange column is AG1-X8 anion exchange resin in chloride form, or 717 strong alkaline anion exchange resin in chloride form;
    or wherein the nitrate salt and nitrite salt enrichment unit comprises:
    a cation exchange column, configured for enriching anions in the sample to be detected to obtain the enrichment solution containing $HNO_3$ and $HNO_2$, and wherein the filling resin of the cation exchange column is 732 strong acidic cation resin in the hydrogen form.

5. The system according to claim 1, wherein the chemical conversion unit comprises:
    a silver oxide supply device;
    a first reaction device, the silver oxide supply device is configured for supplying silver oxide to the first reaction device, whereby the silver oxide reacts with the enrichment solution in the first reaction device to form a product system containing a silver salt;
    a first solid-liquid separation device, configured for performing solid-liquid separation on the product system to obtain a solution containing silver nitrate and silver nitrite, and wherein the first solid-liquid separation device is a centrifuge device;
    a drying device configured so that the solution containing silver nitrate and silver nitrite is dried in the drying device to obtain a dry solid containing silver nitrate and silver nitrite, and wherein the drying device is a freeze-drying device;
    a dissolving device, configured for dissolving silver nitrate and silver nitrite in the dry solid in the dissolving device by using an organic solvent to obtain a suspension liquid;
    second solid-liquid separation device, configured for performing solid-liquid separation on the suspension liquid to obtain an organic solution of silver nitrate and silver nitrite, and wherein the second solid-liquid separation device is a centrifuge device;
    an R-X supply device, wherein X is halogen;
    a second reaction device, the R-X supply device supplies R-X to the second reaction device, and the second reaction device is configured for reacting an organic solution separated by the second solid-liquid separation device with the R-X to convert the silver nitrate in the organic solution into $RONO_2$ and the silver nitrite into $RNO_2$; and
    a third solid-liquid separation device, configured for performing solid-liquid separation on a reaction product in the second reaction device, and wherein the third solid-liquid separation device is a centrifuge device.

6. A method for simultaneous determination nitrogen and oxygen isotope compositions in nitrate and nitrite, wherein the method comprises:

step S1, converting nitrate in a sample to be detected into $RONO_2$, converting nitrite in the sample to be detected into $RNO_2$ to form a solution to be detected, wherein R is a $C_1$-$C_{20}$ alkyl group with or without an aryl substituent of 6-12 carbons; and step S2, determining $RONO_2$ and $RNO_2$ in the solution to be analysed by adopting a gas chromatography/pyrolysis/gas chromatography/isotope ratio mass spectrometry coupling technology to perform $\delta^{18}O$ and $\delta^{15}N$ isotope analysis.

7. The method according to claim 6, wherein the step S1 comprises:

step S11, enriching anions in the sample to be detected by an ion exchange means to obtain an enrichment solution containing $HNO_3$ and $HNO_2$;

step S12, reacting anions in the enrichment solution with $Ag_2O$ to obtain a product system containing $AgNO_3$ and $AgNO_2$;

step S13, performing a first solid-liquid separation on the product system to obtain a solution containing silver nitrate and silver nitrite, and wherein the first solid-liquid separation is centrifugal separation;

step S14, drying the solution containing silver nitrate and silver nitrite to obtain a dry solid containing silver nitrate and silver nitrite, wherein the drying is freeze-drying;

step S15, dissolving silver nitrate and silver nitrite in the dry solid by using an organic solvent to obtain a suspension liquid, wherein the organic solvent is acetonitrile;

step S16, performing a second solid-liquid separation on the suspension liquid to remove insoluble substances to obtain an organic solution of silver nitrate and silver nitrite, and wherein the second solid-liquid separation is centrifugal separation;

step S17, reacting the organic solution with R-X to convert the silver nitrate in the organic solution into $RONO_2$, and converting the silver nitrite into $RNO_2$ to obtain a conversion system, wherein X is a halogen;

step S18, performing a third solid-liquid separation on the conversion system to obtain a solution to be detected, and whereinpreferably the third solid-liquid separation is centrifugal separation.

8. The method according to claim 7, wherein the step S11 comprises:

performing ion exchange on anions in the sample to be detected by adopting an anion exchange column to obtain an anion exchange column enriched with anions, wherein a filling resin of the anion exchange column is an AG1-X8 anion exchange resin, or 717 strong alkaline anion exchange resin in chloride form; and replacing anions containing nitrate ions and nitrite ions in the anion exchange column by hydrochloric acid to obtain the enrichment solution containing $HNO_3$ and $HNO_2$;

or the step S11 comprises:

performing ion exchange on the cation in the sample to be detected by using a cation exchange column to obtain the enrichment solution containing $HNO_3$ and $HNO_2$, wherein a filling resin of the cation exchange column is a 732 strong acidic cation resin in the hydrogen form.

9. The method according to claim 7, wherein in the step S17, a ratio of the mole number of R-X to the total mole number of silver nitrate and silver nitrite is more than 1:1.

10. The method according to claim 6, wherein in the step S2, the concentration of the solution to be detected is 0.5 mg/ml to 1.0 mg/ml.

11. The method according to claim 6, wherein the step S2 comprises:

separating $RONO_2$ and $RNO_2$ in the solution to be detected by using a first gas chromatographic column to obtain separated a $RONO_2$ and a $RNO_2$;

sequentially pyrolyzing the $RONO_2$ and the $RNO_2$ to obtain pyrolysis gases containing CO and $N_2$;

respectively separating the CO and the $N_2$ in the pyrolysis gases by using a second gas chromatographic column; and performing isotope ratio mass spectrometry analysis on the CO and the $N_2$ sequentially to obtain $\delta^{18}O$ and $\delta^{15}N$ isotope compositions of CO and the $N_2$.

12. The method according to claim 11, wherein the first gas chromatographic column is a medium-polarity gas chromatographic column or a weak-polarity gas chromatographic column, and wherein the first gas chromatographic column is an HP-5 chromatographic column filled with 5%-phenyl-methylpolysiloxane, or a DB-HeavyWAX chromatographic column filled with polyethylene glycol.

13. The method according to claim 11, wherein the second gas chromatographic column is a molecular sieve type gas chromatographic column, and wherein the second gas chromatographic column is an HP-Molsieve chromatographic column or an HP-PLOT Q chromatographic column.

* * * * *